May 23, 1933. H. W. INGLE 1,911,119
GLASSWARE FORMING MACHINE
Filed May 4, 1928 13 Sheets-Sheet 2
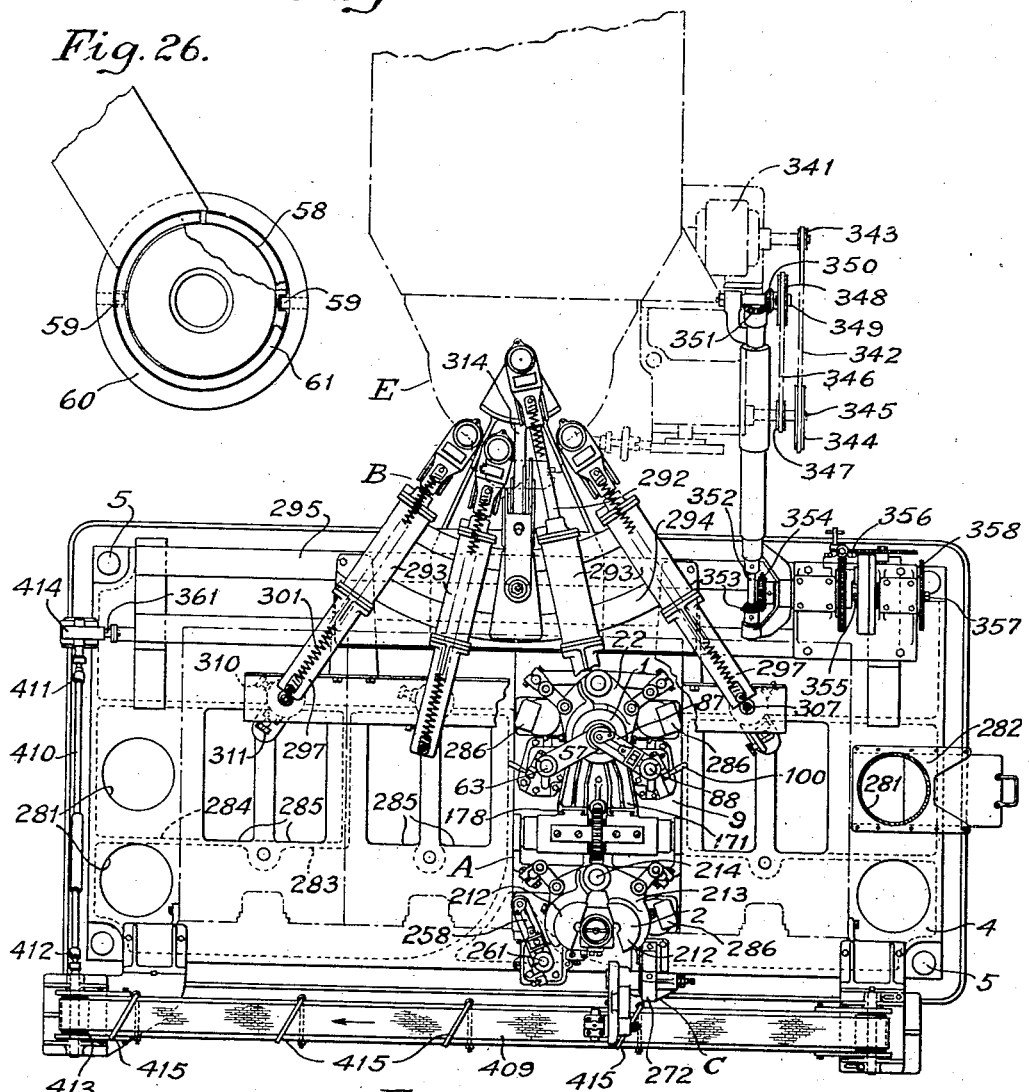
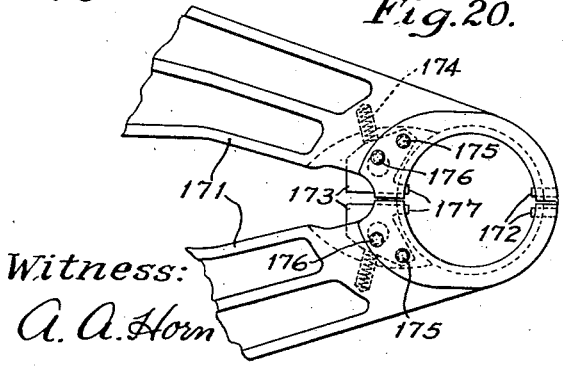
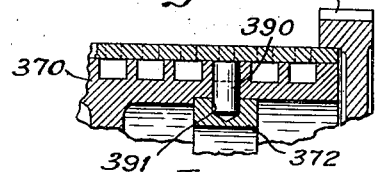
Witness:
A. A. Horn
Inventor
Henry W. Ingle
by Robson D Brown
Attorney May 23, 1933.  H. W. INGLE  1,911,119
GLASSWARE FORMING MACHINE
Filed May 4, 1928  13 Sheets-Sheet 3

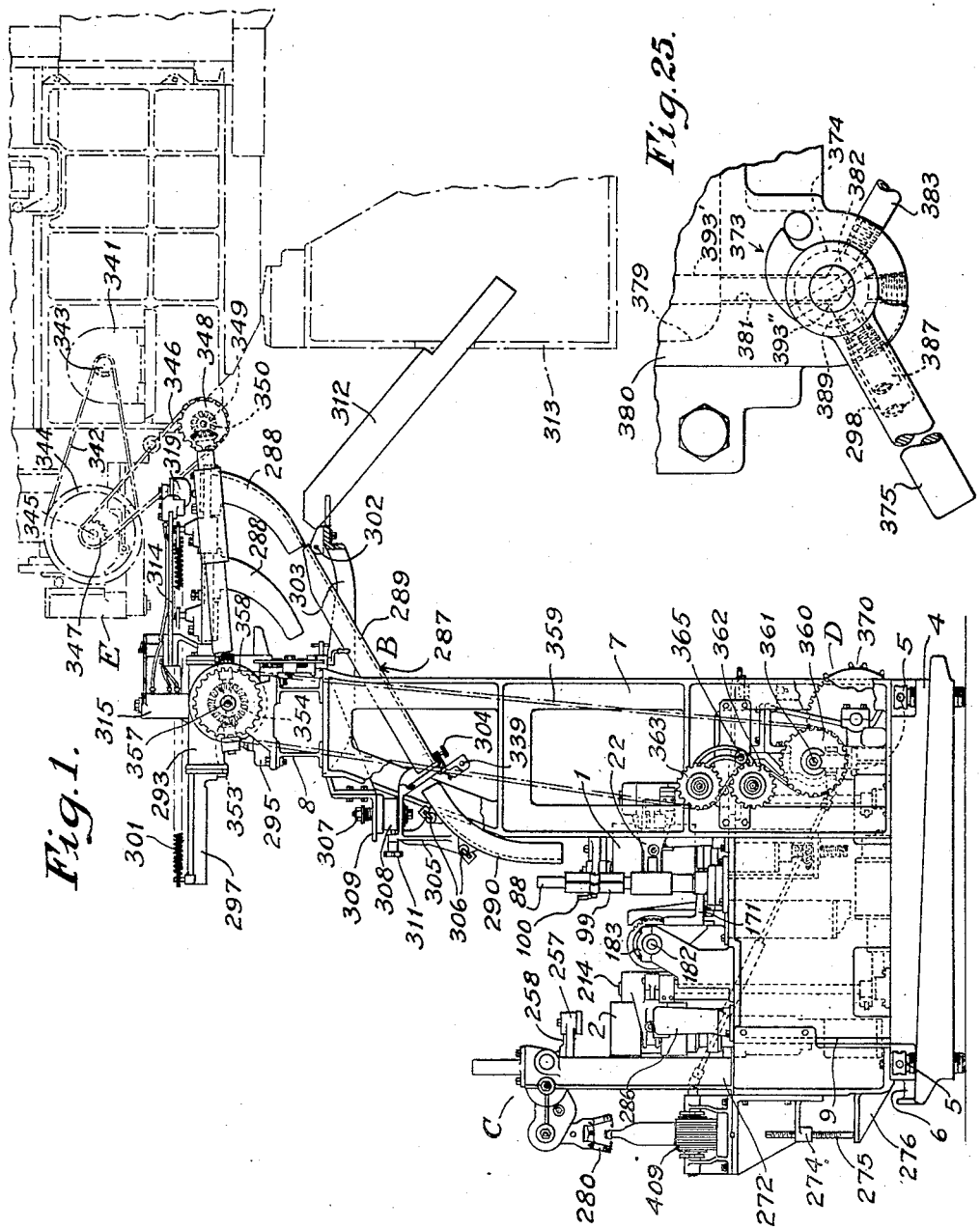

Witness:
A. A. Horn

Inventor
Henry W. Ingle
by Robson D. Brown
Attorney.

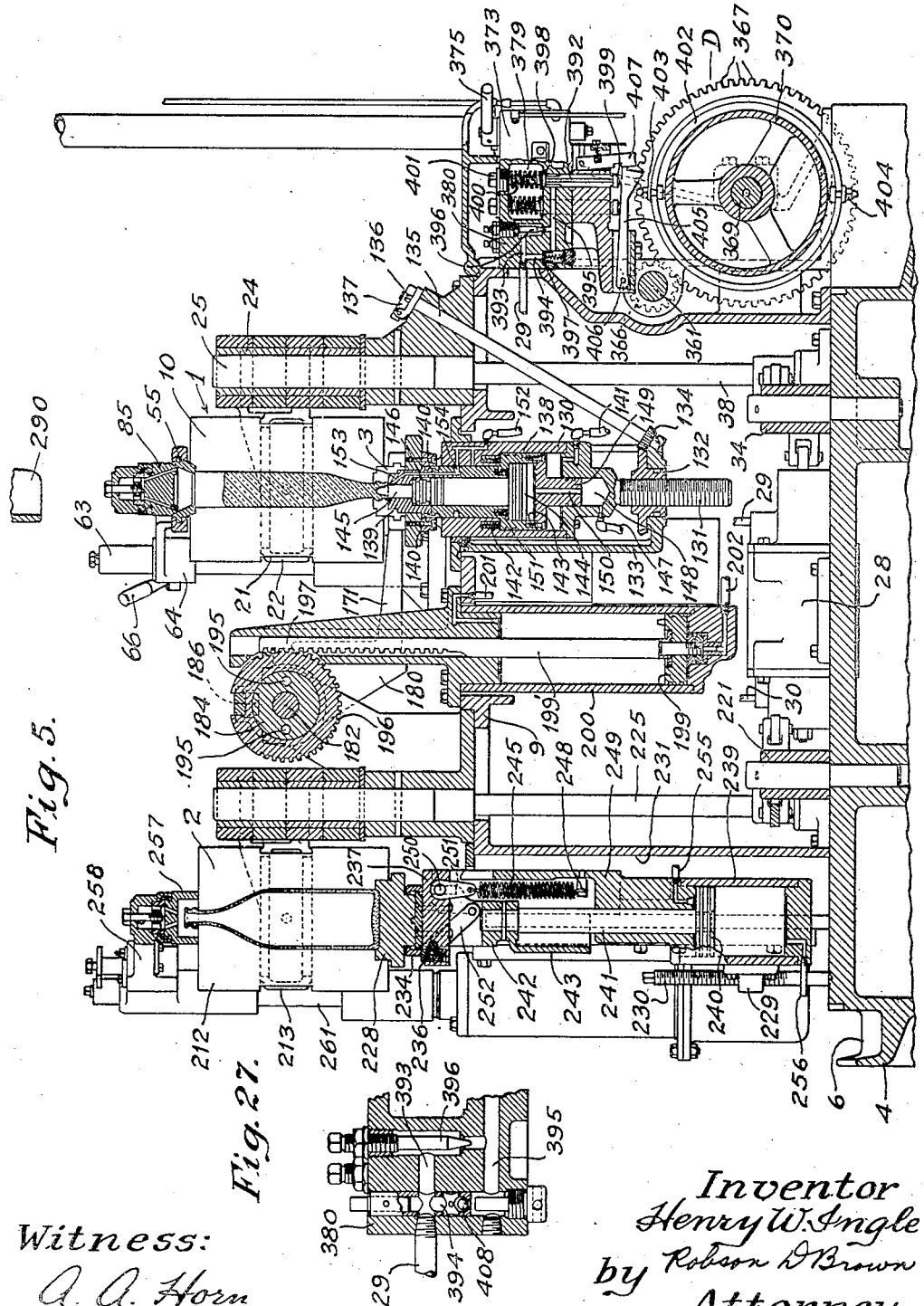

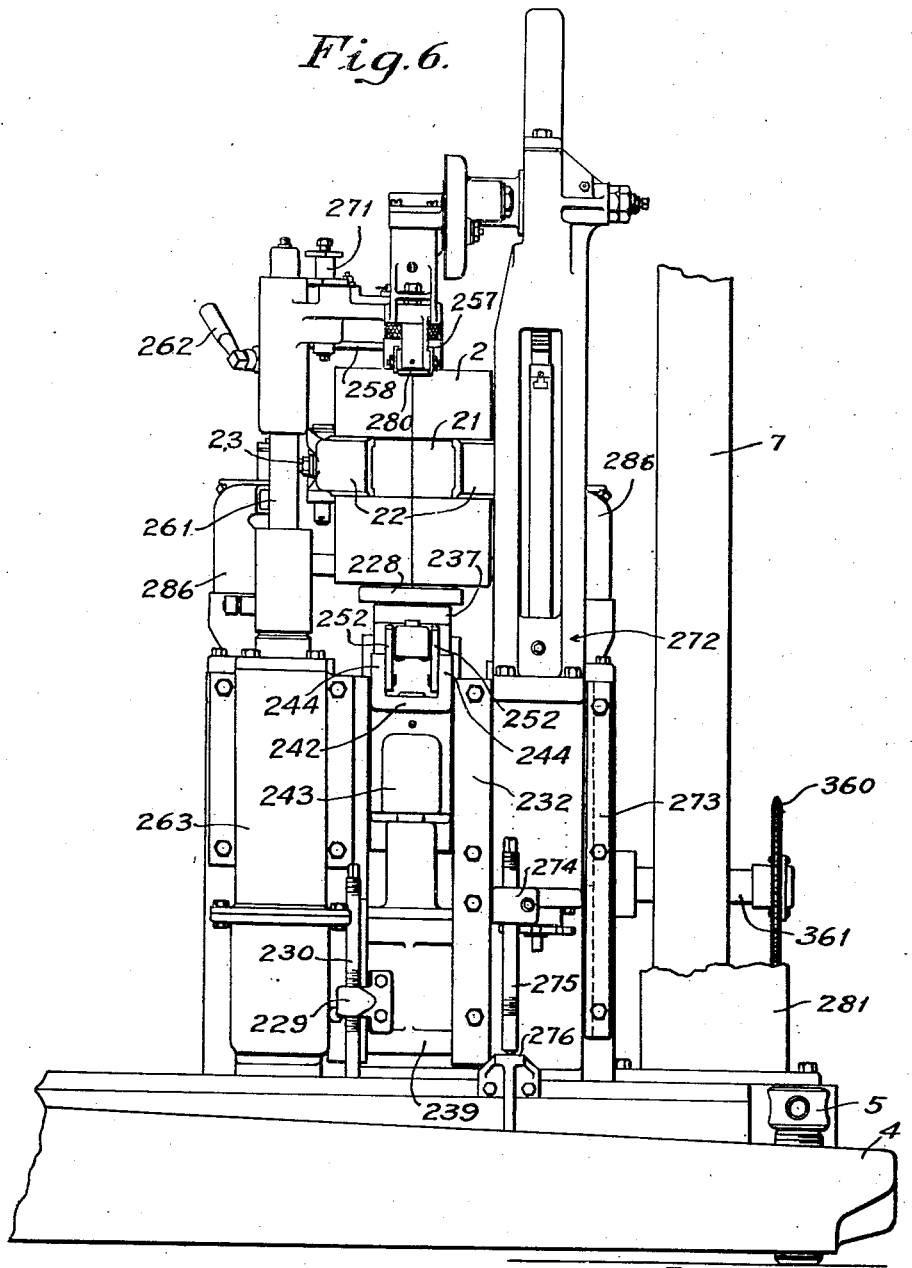

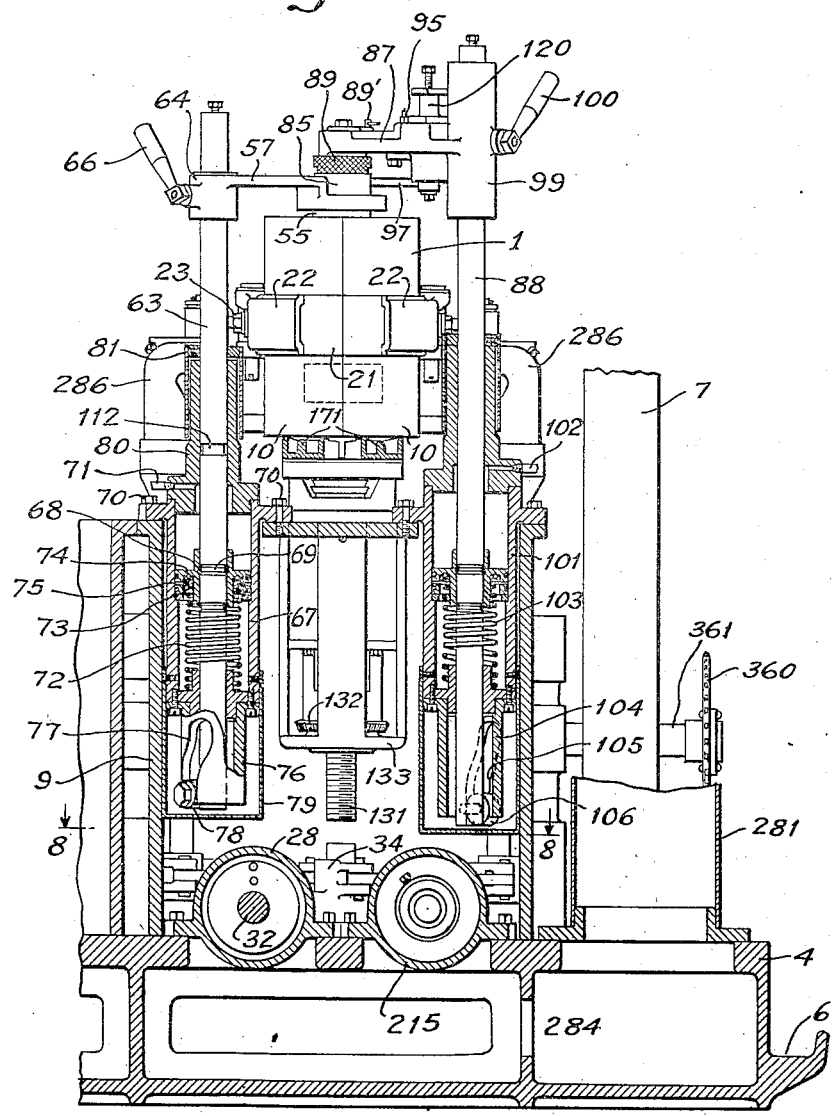

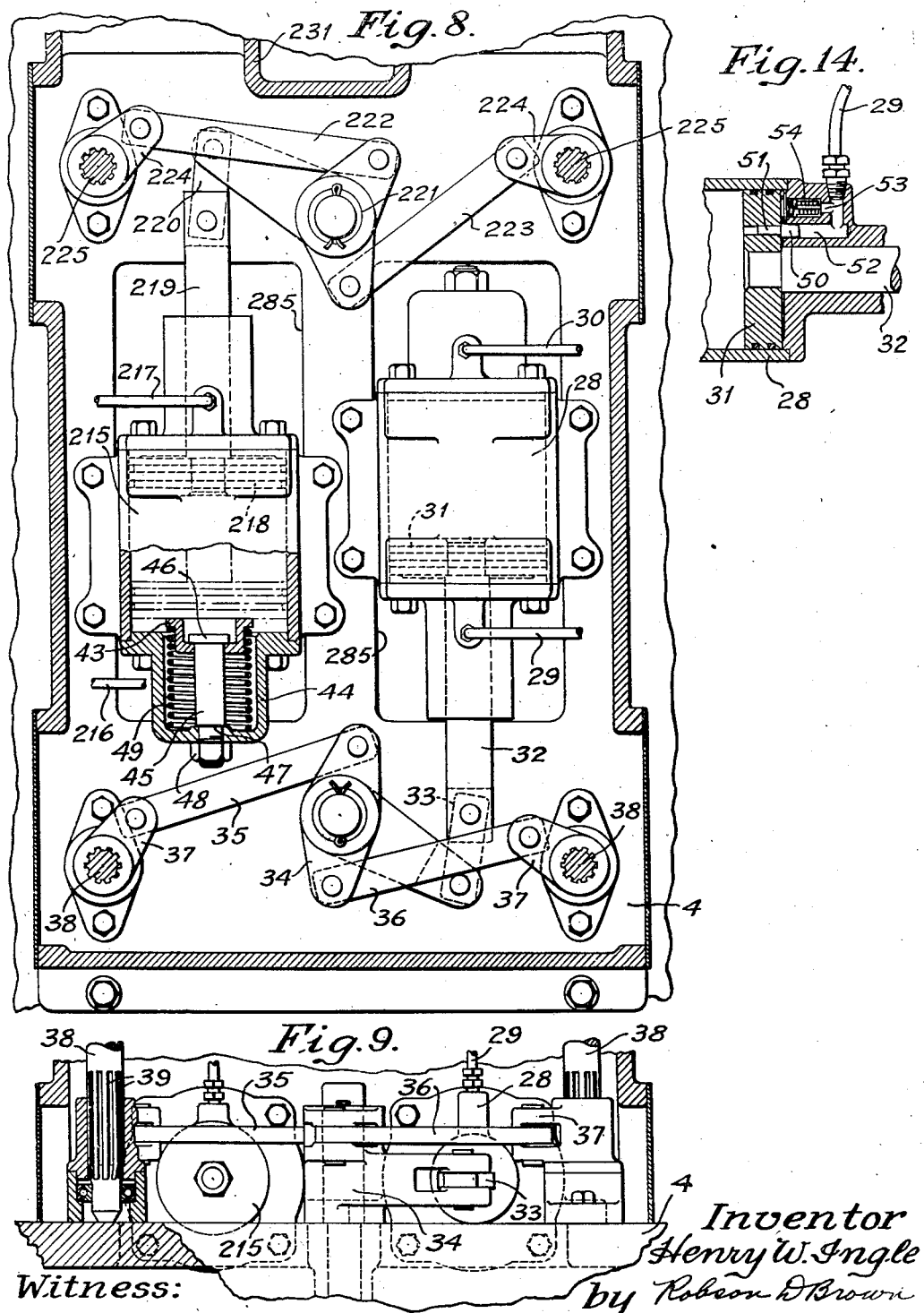

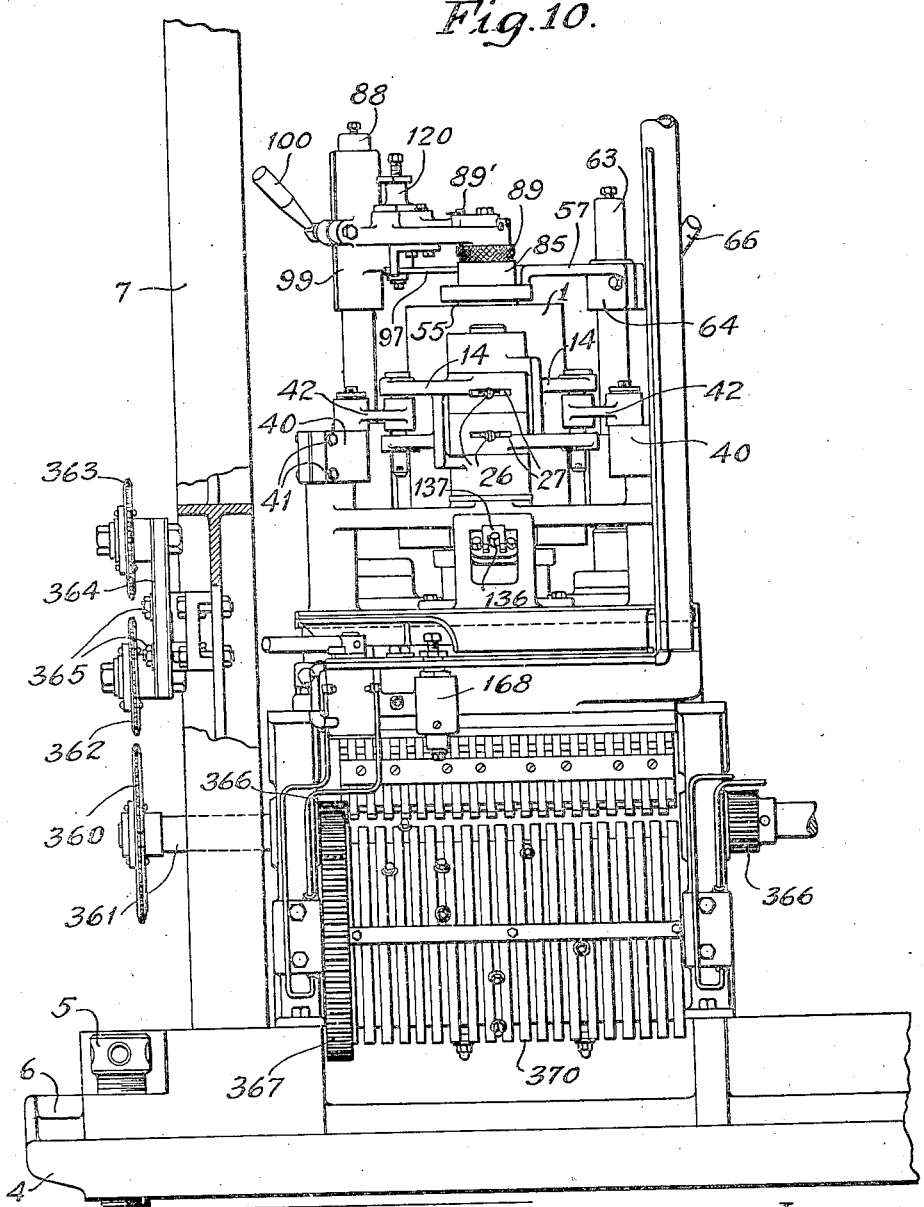

May 23, 1933.  H. W. INGLE  1,911,119
GLASSWARE FORMING MACHINE
Filed May 4, 1928    13 Sheets-Sheet 10
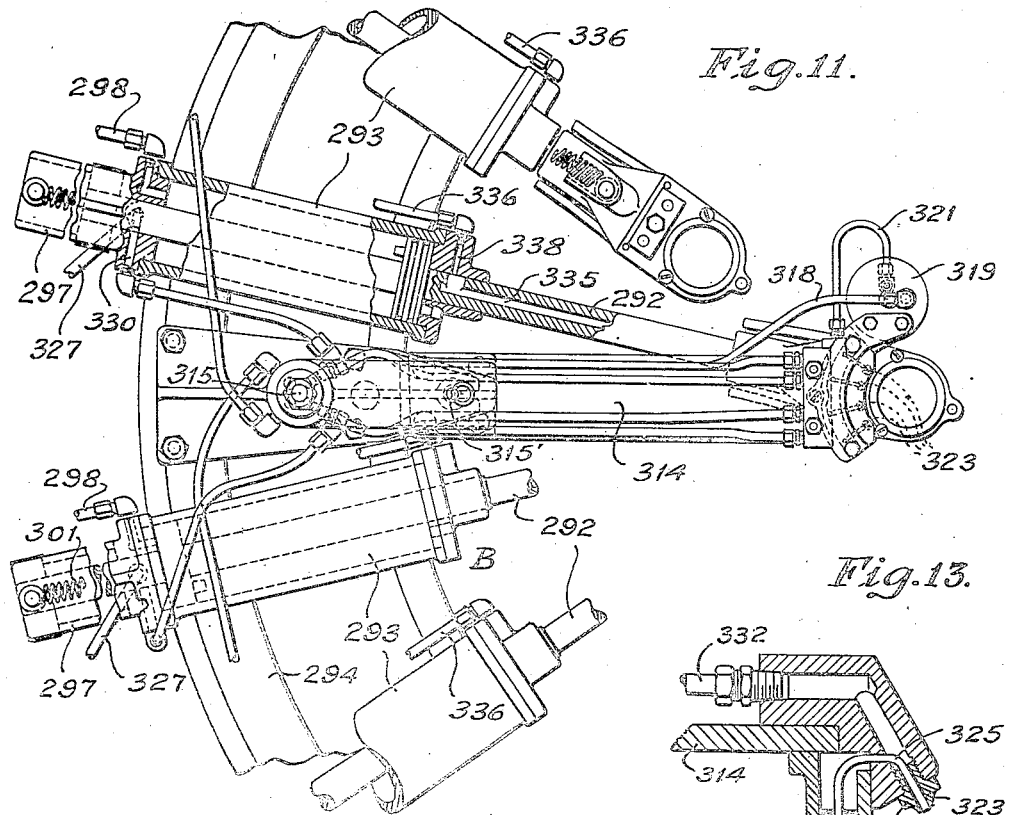
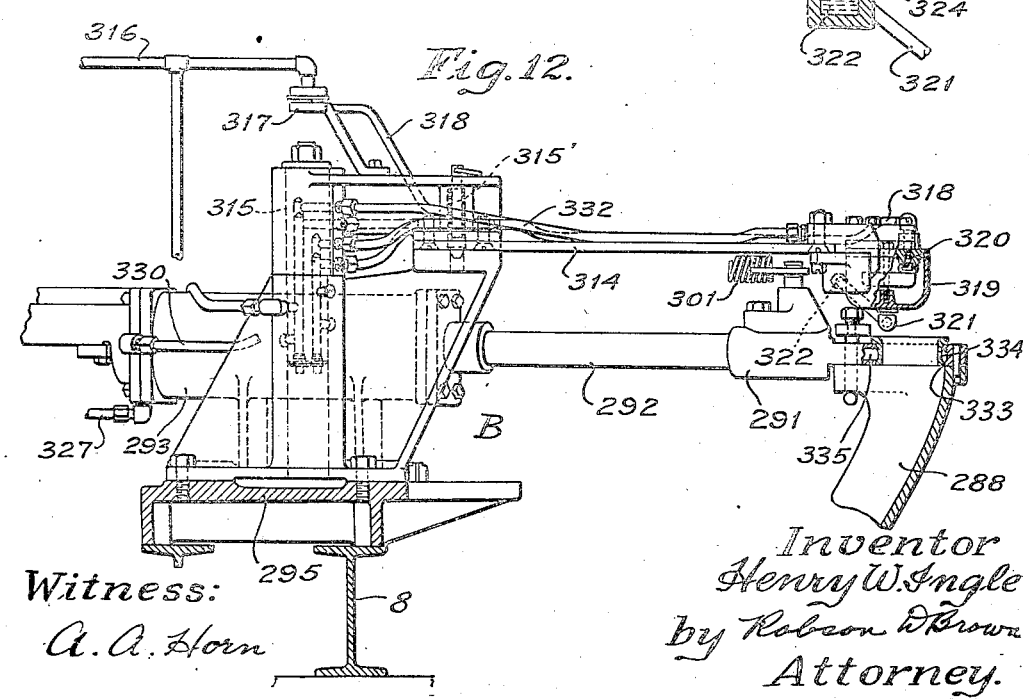
Witness:
A. A. Horn
Inventor
Henry W. Ingle
by Robson D. Brown
Attorney.

May 23, 1933. H. W. INGLE 1,911,119
GLASSWARE FORMING MACHINE
Filed May 4, 1928   13 Sheets-Sheet 11
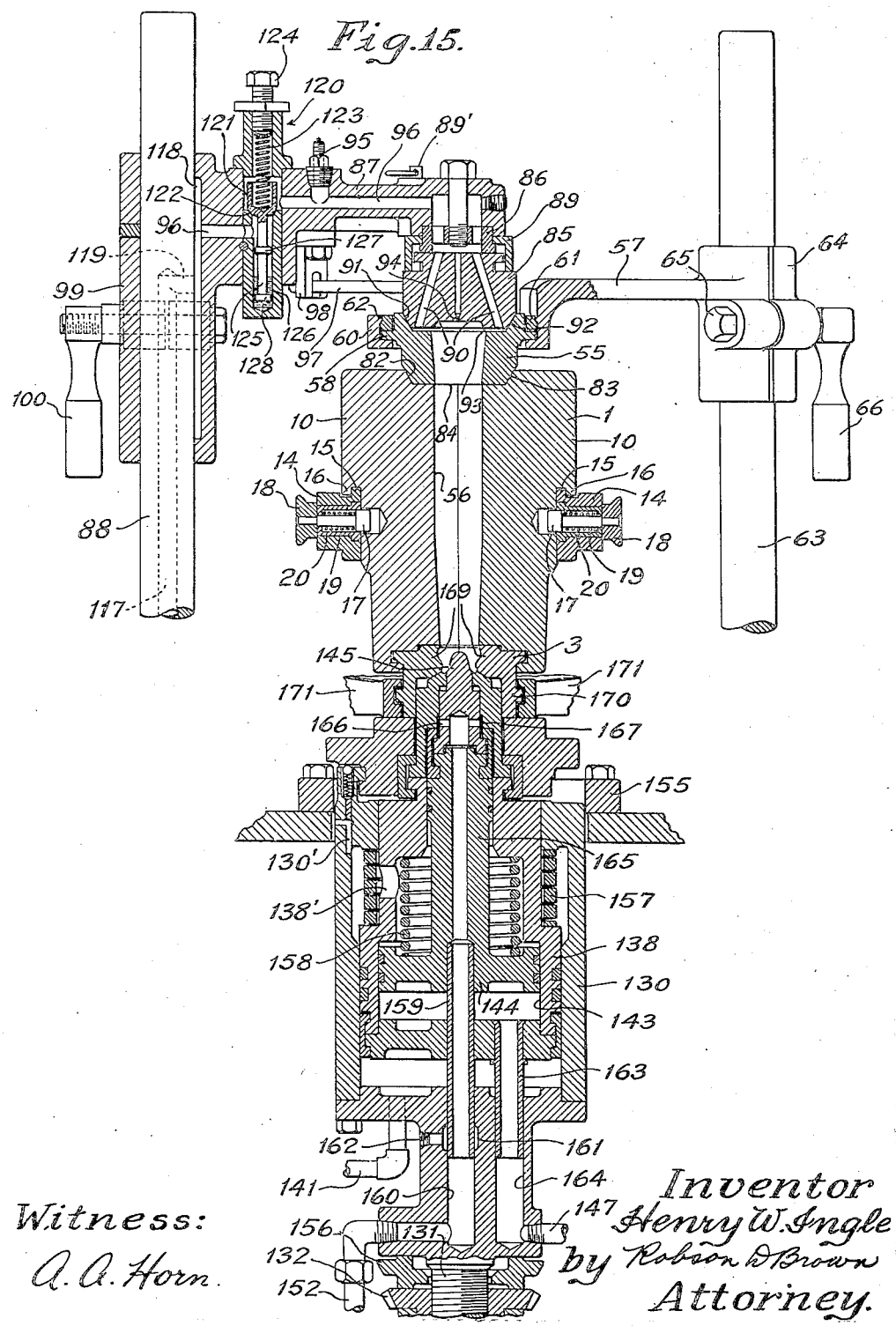
Witness:
A. A. Horn.
Inventor
Henry W. Ingle
by Robson D Brown
Attorney.

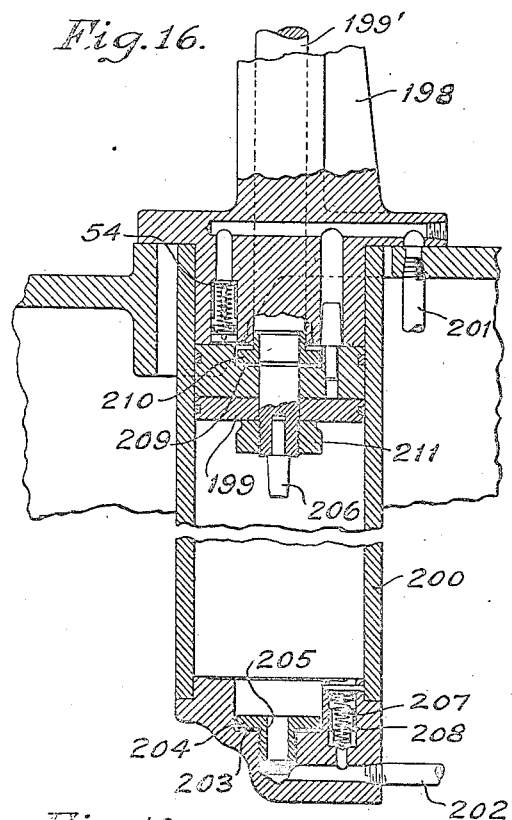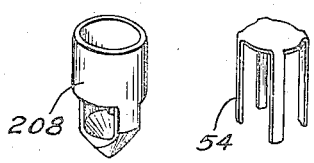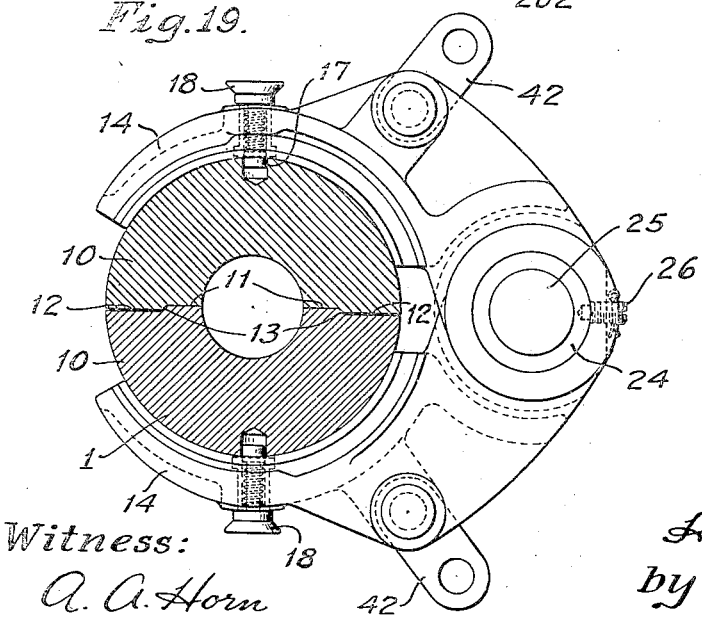

May 23, 1933.  H. W. INGLE  1,911,119
GLASSWARE FORMING MACHINE
Filed May 4, 1928   13 Sheets-Sheet 13
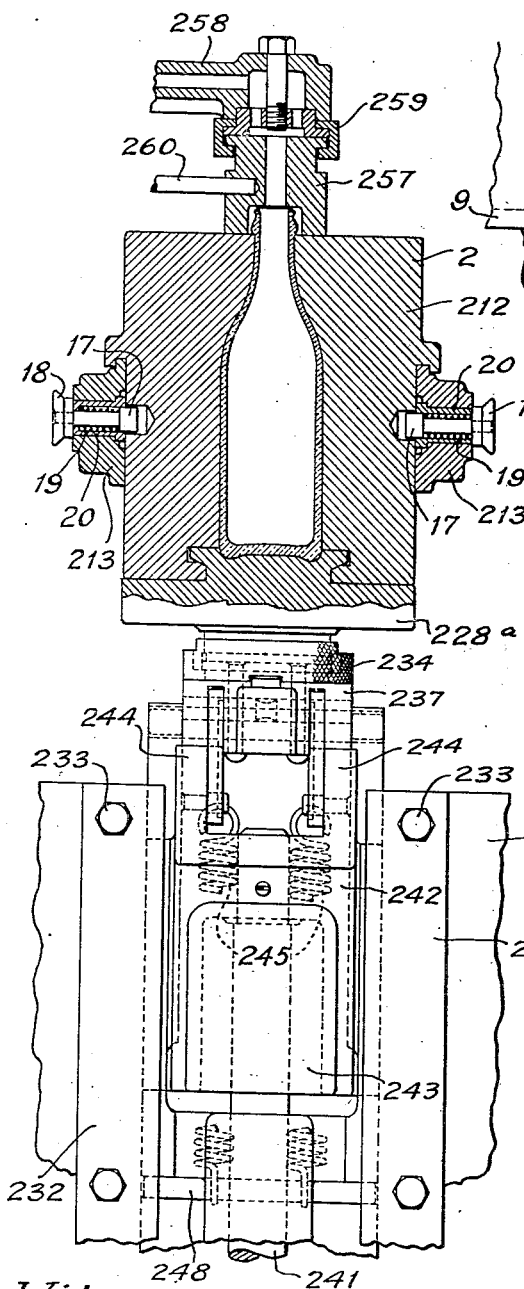
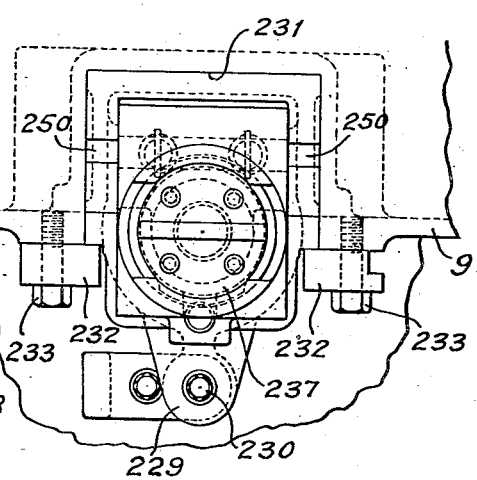
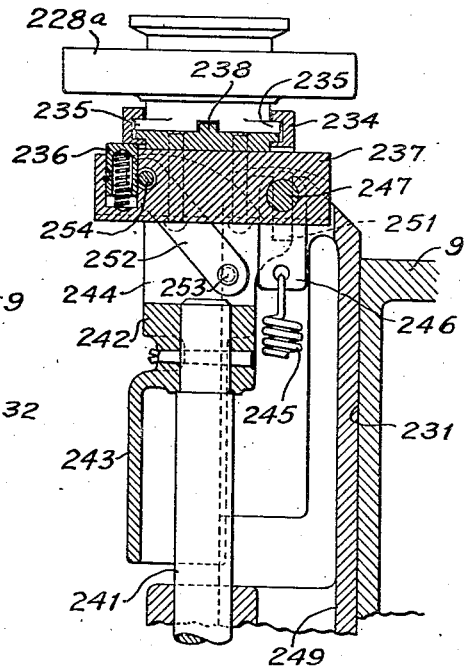
Witness:
A. A. Horn
Inventor
Henry W. Ingle
by Robson D Brown
Attorney.

Patented May 23, 1933

1,911,119

UNITED STATES PATENT OFFICE

HENRY W. INGLE, OF WEST HARTFORD, CONNECTICUT, ASSIGNOR TO HARTFORD-EMPIRE COMPANY, OF HARTFORD, CONNECTICUT, A CORPORATION OF DELAWARE

GLASSWARE FORMING MACHINE

Application filed May 4, 1928. Serial No. 275,093.

This invention relates to the manufacture of glassware, and it has particular relation to the production of blown glassware by a system in which blanks or parisons are formed in parison molds, are transferred to finishing molds and are there blown into final shape. The present invention is an improvement on the machines shown and described in my prior applications, Serial No. 735,079, filed August 30, 1924 and Serial No. 743,531, filed October 14, 1924.

Among the objects of the present invention are to provide a machine which is constructed of a plurality of independent sections which may be timed to be simultaneously operated and to be fed from a single feeder which discharges individual gobs or charges of molten glass, which charges are successively distributed to the various sections in a predetermined order. The machine includes a charge distributing means for conducting the charges of glass from the feeder outlet to the various sections, the sections themselves, and suitable take-out means for removing the finished ware from the finishing mold of each section and placing it upon a suitable conveyor or other receiving station by or from which it may be carried to the annealing lehr.

A further object of the invention is to provide a controlling system for the various sections, permitting any section to be stopped at any time without interrupting the operation of any of the other sections, and permitting the various glass forming parts of any section to be started at any time prior to the starting of the charge distributing device associated with that section, whereby interference betwen the charge diverting devices or scoops used in the distribution of the charges from the single feeder to the various sections is prevented. The machine is further so timed that by moving a single valve for any section, all of the operating parts of that section are thereby stopped and the charge distributing device will be automatically moved to an inoperative position, so as not to interfere with the continued operation of the other sections.

A further object of the invention is to so arrange the timing means for each section that a number of sections less than the whole may be operated in evenly timed relationship with each other and the feeding devices may properly be timed with respect thereto, so that no charges will be wasted. This timing means is further designed to permit the timing of any or all of the sections in any other desired timed relationship, whereby, for example, the present machine may be used with a single glass feeding device along with other forming machines in properly timed relationship.

A further object of the invention is to provide means associated with the charge distributing devices to lubricate the various chutes used to distribute the charges to the several sections, and to assist in conveying the charges down these chutes.

A further object of the invention is to provide an improved type of mold which is made in two halves, so shaped that when the halves approach each other, they will automatically adjust themselves to a properly registered position, whereby to minimize the mold lines on the ware.

A further object of the invention is to provide various means for holding the mold halves in suitable holders to permit a limited floating movement therein to effect the registration described above, these means providing for the easy removal of the mold halves from the holders.

A further object of the invention is to provide improved means for limiting the angular displacement of members used to cooperate with the charge receiving end of the parison mold, such as the funnel and the baffle which insures their proper cooperation with the mold when making non-circular ware, such means being also usable in some cases in connection with the blowhead used with the final blow mold.

A further object of the invention is to provide automatic pressure controlling valves in conjunction with the various pressure lines for blowing the ware, these valves being shut until a predetermined pressure is reached, and being provided with dash pots to insure their smooth opening and closing action.

A further object of the invention is to provide suitable automatic control for the settle blowing air and to provide a means permitting the escape of the air trapped in the upper portion of the parison mold and displaced during the counterblowing operation.

A further object of the invention is to provide a scavenging bottom plate for the finish blow mold which tips to dump any cullet therefrom or misformed bottle not normally removed by the action of the take-out device, thus effecting a separation of the perfect ware from the imperfect ware. This bottom plate may also be used as a push-up bottom plate which may be desirable in making certain types of ware, the peculiar motions of the bottom plate and the mechanism for producing them constituting one of the features of the invention.

A further object of the invention is to provide a novel construction for cooling the various parts of the machine which might become overheated, especially the molds, and means are provided for this purpose permitting the regulable cooling of each half of each mold. In the construction of the present machine, several of the operating parts are enclosed in a base chamber, and this chamber is employed as a plenum chamber for the cooling air, whereby the moving parts enclosed therein will be positively cooled.

A further object of the invention is to provide a novel construction of the pneumatic cylinders and associated parts used for operating certain of the mechanisms of the machine, whereby the movements of the pistons adjacent to one or both ends of their strokes are cushioned by resilient air cushions, and whereby the starting movement of the pistons from the ends having the air cushions will be uninterrupted.

A further object of the invention is to provide a pneumatic cylinder for use with an inverting mechanism of the type shown in my prior applications above referred to, wherein provision is made for varying the length of the piston stroke for the purpose of determining the endmost positions of the inverting means at one or both ends of its path of movement, this adjustment being desirable both in the initial set up of the machine and subsequently to compensate for wear of the moving parts.

A further object of the invention is to provide a means for cracking the parison and final blow molds a predetermined amount and a predetermined variable time prior to full opening of the molds for the purpose in the parison mold of controlling the reheating of the chilled skin of the parison while limiting the heat loss therefrom by radiation to objects cooler than the mold; and in the case of the final blow mold, to permit the mold to be cracked open while the finished article is supported in a central position between the final blowhead and the bottom plate, thus preventing the article from sticking to either of the mold halves. This latter may also be used, if desired, in connection with the parison mold.

A further object of the invention is to provide a new and improved arrangement of neck pin and thimble for cooperating with the finish of the bottle in the parison mold, and to provide for the vertical adjustment of these elements as a whole for accommodating molds of various sizes.

Other objects and advantages of the present invention will be apparent from a reading of the following description and subjoined claims when taken in connection with the accompanying drawings, in which:

Figure 1 is a side elevation of the entire machine in its cooperative relation with a feeding device;

Fig. 2 is a plan view of the same, showing, however, only one of the sections and the details of the passages for conducting cooling air to the various sections;

Fig. 5 is a vertical section taken substantially on the line 5—5 in Fig. 3;

Fig. 6 is a front elevation of a single section;

Fig. 7 is a vertical section through one of the sections of the machine taken substantially on the line 7—7 in Fig. 3;

Fig. 8 is a horizontal section taken on the line 8—8 in Fig. 7 and showing the mold operating cylinders, a part of one of which is broken away and in section to show the interior construction and to show the construction of the mold cracking mechanism;

Fig. 9 is a fragmentary elevation with parts in section of the mechanism shown in Fig. 8, showing in detail some of the linkage for opening and closing the molds;

Fig. 10 is a rear elevation of a single section of the machine with a part of one of the frame members broken away to show certain details;

Fig. 11 is a fragmentary plan view of the scoop operating mechanisms and scoop oiling devices with certain parts in section to show the interior construction;

Fig. 12 is an elevation, with certain parts in section, of a part of the mechanism shown in Fig. 11;

Fig. 13 is a central vertical section through one of the oil spray nozzles and its associated maintained level oil chamber;

Fig. 14 is a fragmentary central section of one end of one of the pneumatic cylinders for operating certain of the mechanisms of the machine, showing the taper plug and check valve device for providing an air cushion at the end of the piston stroke;

Fig. 15 is a central vertical section through a parison mold, funnel, baffle and associated neck pin or plunger and thimble mechanisms, certain details of which are modifications of the corresponding construction shown in certain of the other figures;

Fig. 16 is a central vertical section through the cylinder for operating the parison inverting mechanism, showing the means for varying the length of the piston stroke therein for varying the terminal positions of the inverting mechanism;

Figs. 17 and 18 are perspective views of the members used as check valves in the various cylinder heads;

Fig. 19 is a horizontal section of one of the molds showing the design of the inter-engaging halves and a means for retaining them in their holders;

Fig. 20 is a plan view of the neck ring holders with the neck ring halves removed to show the mechanism for holding these halves in their holders;

Fig. 21 is a fragmentary section of a portion of the operating drum on an enlarged scale to show the mechanism used for varying the timing of one section with respect to that of the others;

Fig. 22 is a vertical section of a final blow mold and its associated blowhead and bottom plate mechanism showing a different type of bottom plate than that shown in certain of the other figures;

Fig. 23 is a plan view of the bottom plate holding device with the plate itself removed;

Fig. 24 is a vertical section of the bottom plate moving and tipping device with the bottom plate itself shown in elevation;

Fig. 25 is a fragmentary plan view on an enlarged scale showing the main control valve for each section;

Fig. 26 is a plan view with certain parts broken away, showing the funnel supporting means and especially the means for preventing an excessive angular displacement of the funnel with respect to its support; and Fig. 27 is a detail of a ball check valve for use in controlling the exhaust from certain of the cylinders to prevent "coasting" of the parts.

Figure 3:
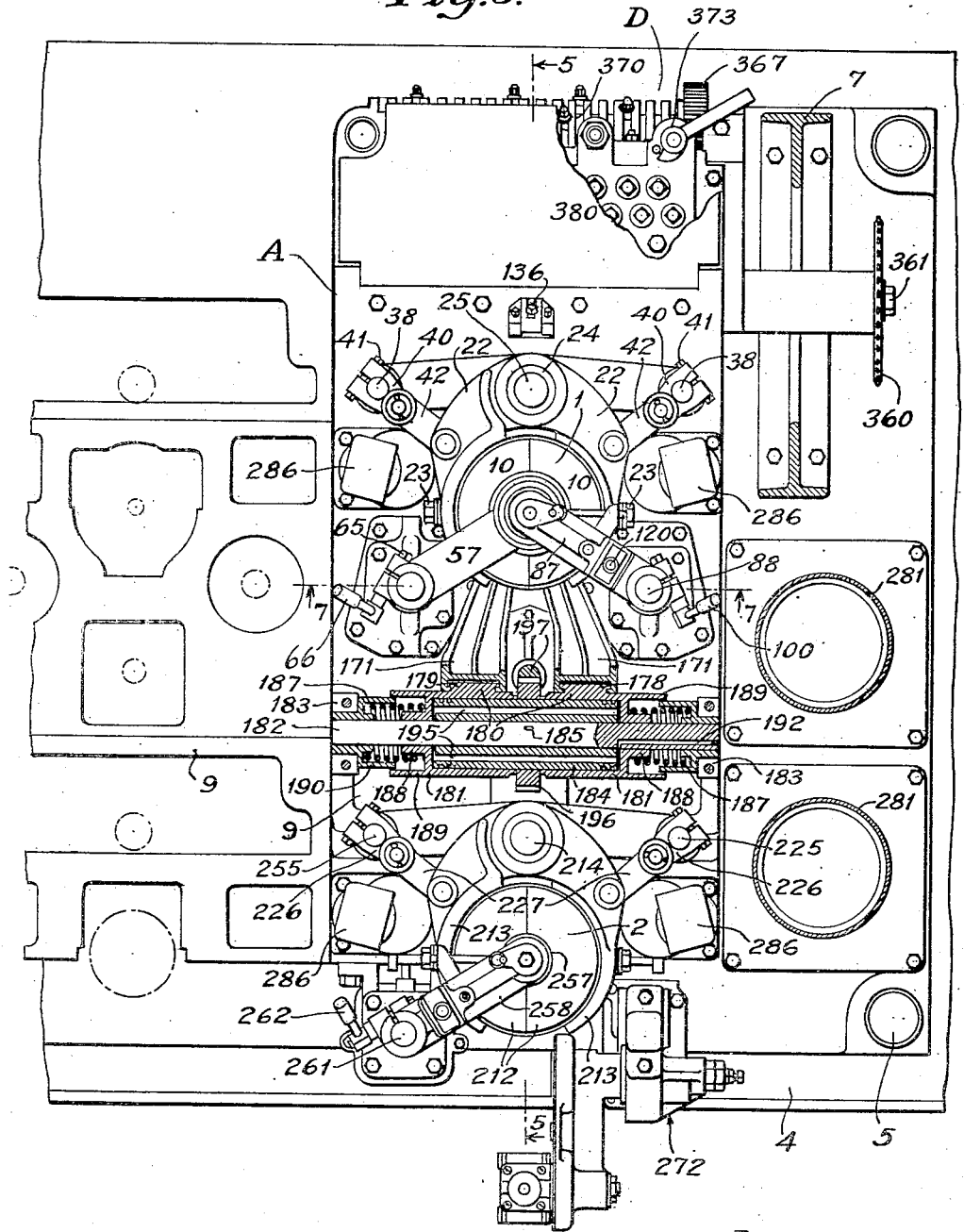
Fig. 3 is a plan view of a single section on an enlarged scale with certain parts broken away and with certain parts, including the hub of the inverting mechanism shown in section to illustrate the interior construction thereof.

A glass working apparatus embodying mechanical aspects of the present invention is illustrated in general in the accompanying drawings as comprising a plurality, four in this instance, of shaping machines or individual sections A, each embodying a single and relatively stationary blank or parison mold and a single relatively stationary blow mold and each being capable of independently performing a complete glass fabricating operation; a delivery mechanism B for successively supplying the several shaping machines with mold charges of predetermined size and shape from a single glass feeding device; a plurality of take-out devices C for removing the ware from each of the shaping machines and conveying it to a desired location, in this instance a conveyor extending completely across the bank of forming machines; and a pressure controlling mechanism D for adjustably regulating the application of the operating fluid pressures of the several shaping machines and those of the delivery and take-out instrumentalities, and also the application of certain of the blowing pressures, in proper sequence and in timed relation with respect to each other and to the operation of the feeding device E. These several mechanisms will be described in the order mentioned above.

Shaping Machine A

General construction

The shaping machines A are arranged in multiple, and in the present instance are secured together in side by side relation in any convenient manner, although it may be desired to mount these machines on a rotatable table or turret. Referring to Figs. 2, 3, 4 and 5, each of the machines or sections embodies a blank or parison mold 1 which is disposed in a permanently inverted position at the blank forming station, a blow mold 2 which is permanently disposed in a neck-up position at the finish blowing station and a neck ring 3 which is adapted to be swung about a horizontal axis from the blank forming station to the finish blowing station to transfer a blank or parison from the parison mold 1 to the blow mold 2, thereby positioning the parison at the finish blowing station in a neck-up position.

The molds 1 and 2 and the oscillating neck ring 3 are carried by a structure consisting of a base 4 which is preferably relatively heavy to provide a firm support for the various operating parts and to prevent their jarring one another. This base may be provided with suitable adjusting or leveling jack screws 5 bearing upon a suitable floor, or specially designed piers as desired, and is also preferably provided with a peripheral oil draining groove 6 to collect any oil which runs or seeps down from the various parts of the machine. Side frames 7 are suitably secured to the base 4 at either side of the machine and support a super-structure supported upon cross beams 8, Fig. 1, on which is mounted the charge distributing mechanism B and associated parts and also the common drive between the forming machine and the feeder. This super-structure will be described more in detail later on. Each section of the forming machine is provided with a box-like base 9 forming a plenum chamber for the cooling air, in a manner later to be described.

Mold construction

Each blank or parison mold 1 comprises two halves or sections 10 (Fig. 19) which sections meet at a joint in two separate but parallel planes 11 and 12, connected by surfaces 13 inclined with respect to each of the planes 11 and 12, so that one of the halves has a protruding portion received within a recessed portion of the other half and said inclined surfaces converge outwardly of the half having the protruding portion. Thus it will be seen that when the mold halves 10 are closed together, the protruding portion of one of the halves and the tapering recess of the other will tend to bring the halves into correct registration with each other. This action is also insured by the fact that the meeting lines of the several surfaces are all parallel to the axis of the mold. The finish blow molds 2 are preferably similarly constructed.

Securing molds in holders

The halves 10 of each blank or parison mold 1 are detachably secured to mold holders 14 (Figs. 15 and 19) on which they are mounted so as to permit a limited floating movement in a horizontal plane. Specifically, the mold holders 14 are provided with substantially semi-annular upwardly extending ribs 15 which engage beneath outer peripheral shoulders on the mold halves 10, which are in turn provided with substantially semi-annular downwardly extending ribs 16, extending over and received behind ribs 15 on the holders 14, suitable clearance being provided to permit limited floating movement of the mold halves 10 on the holders 14. Means are provided in the holders for preventing the mold halves being accidentally dislodged therefrom, comprising buttons or plungers 17 having knobs 18 fixed thereto and being resiliently pressed inwardly by the spiral springs 19 received between the buttons 17 and inwardly turned annular shoulders on the bushings 20 which are fitted into suitable openings in the holders 14. As shown in Fig. 22, the blow mold halves may be similarly retained in their holders. Thus it will be seen that to remove a mold half from its holder, it is only necessary to pull out the corresponding knob 18 and lift the mold half vertically upward.

I have shown, in Figs. 1 to 7 inclusive, another means for retaining the mold halves on the holders, comprising grooves 21 formed in the mold halves and receiving holders 22 which are preferably secured thereto in such a way as to permit a limited floating movement of the mold halves with respect to the holders, such for example as by threading a bolt 23 through an enlarged opening in the holder 22 into the mold half and inserting some resilient means, as a short spiral spring, between the head of the bolt and the holder.

The holders 14 or 22 are pivoted about a suitable bushing 24 mounted on a vertical shaft 25 which in turn is mounted upon the box frame 9 of each section, each of the holders having a pair of integral spaced hinge portions, as seen in Figs. 5, 10 and 19. Suitable means may be provided, if desired, for preventing the too wide opening of the holders such, for example, as set screws 26 threaded into the bushing 24 and extending through slots 27 in the hinge portions of the holders 14 or 22.

Mold opening and closing mechanism

The blank mold sections 10 are opened and closed by fluid pressure which is admitted to a cylinder 28 and exhausted therefrom through pipes 29 and 30 communicating respectively with the opposite ends of said cylinder and communicating at their other ends with the valve control mechanism later to be described (Figs. 4, 5, 7, 8 and 9). The special details of the cushioning of the piston in the cylinder and the control of the air supply thereto will be described later. The cylinder 28 is provided with a piston 31 mounted on a piston rod 32 which is connected by a suitable pivoted link 33 (Figs. 8 and 9) with one arm of the three-armed rocking beam 34, the other two arms of which are connected by links 35 and 36 respectively with cranks 37 secured to vertical operating shafts 38, one adjacent to either side of the blank mold. The shafts 38 preferably have a plurality of teeth 39 cut in their lower portions cooperating with complementary teeth in the wall of an aperture formed in a sleeve portion integral with the cranks 37. Suitable bearings adapted to sustain both thrust and angular loads are disposed at the bottoms of the shafts 38, as shown at the left in Fig. 9.

Referring now to Figs. 2 and 3, the upper ends of the shafts 38 are provided with suitable cranks 40 which are arranged to be angularly adjustable thereabout to permit the taking up of back-lash after the parts have worn to some extent, by being split at their outer ends, and the split ends secured together about the upper ends of the shafts 38 by means of suitable tightening bolts 41. The cranks 40 are connected to the mold holders 14 or 22 by suitable links 42. Thus it will be seen that movement of the piston 31 in its cylinder 28 will result in the opening or closing of the blank mold halves 10.

Mold cracking mechanism

Suitable means are provided for cracking the blank mold open to a predetermined extent in advance of the full opening movement by the pneumatic pressure entering the cylinder 28 through the pipe 30, such means being the same as shown in connection with the blow mold operating cylinder 215 and comprising an annular member 43 (Fig. 8) movable in a hollow extension 44 on the head at one end of the mold operating cylinder to a point a predetermined distance from the outer end of said hollow extension, this distance being determined by the position and length of a bolt 45 having a head 46 received within a cupped portion of the annular member 43. One or more spacing washers or shims 47 preferably are disposed between a shoulder formed on the bolt and the outer end of the hollow extension 44, the bolt 45 being secured to the head by a suitable nut 48 threaded thereon. A spiral compression spring 49 is disposed between the end of the head 44 and an annular flange on the member 43, tending to move the latter toward the opposite end of the cylinder. The tension of this spring is such, however, that it will be compressed by the fluid pressure entering the cylinder to close the mold which normally forces the piston to the end of the cylinder. If, however, the opposing fluid pressure on the piston is exhausted, the spring 49 is then effective to move the member 43 against the piston and then to move both until the member 43 has moved to the limit of its travel, as determined by the position of the head 46 of the bolt 45. This moves the piston 31 a predetermined distance on its mold opening stroke, as determined by the number and thickness of the shims 47, and thus cracks the mold open a predetermined distance through the mold operating linkage above described. As will be later described, the pneumatic pressures may be exhausted from or admitted to any point of application of pressure at any time by the adjustment of the cam members on the timing drum and, therefore, it is possible to determine the time interval between the cracking of the mold by the mechanism just described and the full opening thereof by the admission of pressure to the operating cylinder 28 through the pipe 30.

*Cylinder-piston cushioning mechanism*

Referring to Figs. 14 and 18, the piston 31 may be provided with a taper plug 50 suitably secured thereto as by a friction fit between its shank 51 and a suitable aperture in the piston, the plug cooperating with the exhaust passage 52 formed in the cylinder head in alignment therewith to limit the exhaust of fluid pressure from the cylinder back through the pipe 29 as the piston 31 approaches the right hand end of its stroke, as seen in Fig. 14. It is obvious that a cylindrical plug having a tapered groove cut therein would have the same action, and I also contemplate the use of such plugs. It is, however, desirable to start the movement of the piston in the opposite direction at the maximum possible speed, and for this purpose I provide a separate air inlet passage 53 communicating with the pipe 29 and provided with a check valve member 54 (Fig. 18) pressed on its seat by a suitable resilient means, such as the spiral spring shown in Fig. 14. Pressure admitted through pipe 29 moves the check valve 54 off of its seat and passes directly to the space to the right of the piston 31, as seen in Fig. 14. As soon as the plug 50 is moved out of the passage 52, a full and wholly uninterrupted passage of air may be admitted to the cylinder through this passage, thus moving the piston to the opposite end of its stroke. On the return movement of the piston, or to the right as seen in Fig. 14, the check valve 54 will be closed during the exhausting of the air in front of the piston through the pipe 29 and the piston will move at substantially its full speed until the plug 50 enters the passage 52. The exhaust will then be checked materially, forming an air cushion in front of the piston which will effectively retard its movement to the end of its stroke, and at the same time the tapered shape of the plug 50 will permit the air of this cushion to leak out, thus permitting the piston to reach the extreme end of its stroke impelled by pressure admitted through the opposite end of the cylinder. The piston 31 in cylinder 28 may be provided with suitable taper plug and check valve arrangements at its other end substantially the same as shown in Fig. 14. Preferably all of the pistons and cylinders used in the machine are also constructed in this fashion at one or both ends, so as to prevent jarring of the parts.

*Funnel and operating mechanism*

The arrangement of the funnel for guiding the charges into the blank mold 1 and of the combined settle blowhead and baffle or counterblow bottom plate is similar to that shown in my prior Patent 1,654,731, granted January 3, 1928. There are, however, certain features of difference, including the specific manner of mounting the funnel in the funnel arm, the specific construction of the blowhead or baffle, the method of mounting the latter in its arm, and the bleed valve arrangements.

Referring to Figs. 4, 5, 7, 10 and 15, the funnel 55 is used to guide the charges of glass into the cavity 56 of the bland mold 1, these charges being delivered thereto by a charge delivery means, later to be described. The funnel 55 is loosely mounted on one end of an arm 57 by providing this funnel with a peripheral flange 58 (Figs. 15 and 26), which flange is provided with two oppositely disposed recesses adapted to receive positioning pins 59. The flange 58 is of somewhat less diameter than the internal diameter of the annular ring 60 formed on the outer end of the arm 57, whereby the funnel is permitted a slight floating motion, the angular extent of this floating motion being limited, however, by the two pins 59. This angular positioning becomes especially important in making non-circular ware, in which it is essential that the funnel register properly with the blank mold. By having two pins rather than one, as is the usual custom, it is possible to restrict the angular movement to a much greater extent while permitting the necessary floating movement, thus insuring the proper registration of the parts. The funnel may be retained within the annular ring 60 by a split spring ring 61 engaging beneath an annular rib 62, as seen in Fig. 15. The other end of the arm 57 is adjustably secured to a vertical operating rod 63 in a suitable manner, as by providing the arm 57 with a suitable split collar 64 having a squeeze bolt 65 and a clamping nut operable by a handle 66.

Means are provided for moving the rod 63 vertically and for rotating it comprising a cylinder 67 (Figs. 4 and 7), the rod 63 constituting a piston rod which extends through both heads of cylinder 67 and being provided intermediate its ends with a suitable piston 68 which may be fixed thereto in any suitable manner, as by providing the rod with one or more annular grooves 69 into which some easily fusible metal, such as babbitt, may be poured. This method may also be made use of in the other cylinders of the machine, if desired. The cylinder 67 is secured to the top wall of the box-like base 9 of the section, as by bolts 70. A fluid pressure pipe 71 communicates with the top end of the cylinder 67 and provides a means for moving the piston 68 and the rod 63 downwardly. Upward motion of the piston and rod is provided by a spiral compression spring 72 extending between the lower head of the cylinder and the piston 68. Specifically, the upper end of this spring is normally received on an annular ring 73 separated from the piston 68 by balls 74, the ring being prevented from moving out of the piston by one or more pins 75 extending through the sides of the piston and being received beneath the ring 73. Thus it will be seen that the piston 68 and its rod 63 may be rotated in the cylinder 67 without rotating the spring 72. The means for giving the rod 63 a rotative movement comprise a sleeve 76 secured to the lower end of the cylinder and provided with a helical slot 77 in which is received a pin or roll 78 fixed to the rod 63. Preferably the sleeve 76 and its associated parts are protected from dust and other foreign matter by a suitable shield 79 secured to the cylinder 67 in any suitable manner. For the purpose of preventing ingress of dirt or other foreign matter to the cylinder along the rod 63 at the top, the cylinder head may be provided with an upwardly extending portion 80 surrounding the rod 63, which latter is provided with a downwardly turned cup shaped member 81 adapted to telescope with the upwardly extending portion 80 of the cylinder head, thus effectively preventing the ingress of dirt to the cylinder. It will be seen that the funnel may be adjusted laterally or vertically to cooperate with various types of molds by loosening the bolt 65 by the handle 66 and moving the collar 64 on the rod 63. Vertical movements are imparted to the funnel by fluid and spring pressures respectively acting on the piston 68 in the cylinder 67, and rotative movements in response to the vertical movements are imparted to the funnel by the roll 78 working in the helical slot 77. The slot is so designed that as the funnel is raised, it is swung to one side to an inoperative position.

*Blowhead for settle-blow or baffle and operating mechanism*

The lower edge of the funnel 55 is provided with an annular taper 82 for cooperation with a corresponding taper 83 formed in a recess 84 of the mold (Fig. 15), thereby insuring both an accurate registry and an air tight joint between the funnel and the mold. Settle blowing pressure is applied to the mold 1 to pack the mold charge therein for forming the finish of the ware, by means of a blowhead or baffle 85 carried by a head 86 on the end of an arm 87, which is secured to a vertical rod 88. The rod 88 is oscillated to move the blowhead into and out of axial alignment with the funnel and is vertically reciprocated to move the blowhead into and out of operative position with respect thereto by mechanism similar to that described for operating the funnel rod 63. As shown in detail in Fig. 15, the blowhead 85 is secured to the head 86 of the arm 87 by means of a bayonet joint device in a rotatable knurled collar 89 and is provided with blowing passageways 90. A suitable spring pressed detent 89' is used to prevent the accidental rotation of the knurled collar 89, thus locking the blowhead in place. The bottom of the blowhead 85 is provided with an outer beveled edge 91 which is adapted to fit alternately within a beveled surface 92 in the top of the funnel or the beveled surface 83 in the top of the mold. When the blowhead is positioned above the funnel, however, its bottom surface does not seat upon the flat surface 93, thus allowing a clearance through which the settle blowing pressure from the passages 90 may pass. When, however, the blowhead 85 is seated directly upon the mold 1, the passages 90 are closed by the bottom wall of the recess 84 and it becomes necessary to provide a means permitting the egress of the air trapped in the top of the mold cavity which is displaced by the counterblowing of the parison. This may comprise a bleed opening through the blowhead 85 direct to the atmosphere or, as shown, a bleed passage 94 through the blowhead 85, and a bleed valve 95 in the funnel arm 87 communicating between the blow passage 96 in the arm and the atmosphere.

The blowhead 85 is mounted for a limited floating movement with respect to its arm by providing suitable clearance between it and the knurled collar 89 and is permitted a limited angular movement for insuring its proper registration with the mold. The means for limiting the angular movement comprises a guide member 97 fixed in the blowhead 85 and adapted to be positioned between the two ends of a bifurcated lug 98 secured to the arm 87 at some distance from the blowhead. By providing a guiding point at some distance from the axis of rotation of the blowhead 85, it is possible to limit its angular movement to a great extent without materially interfering with the floating movement, which is desirable to permit its proper registration with the funnel and with the mold.

The arm 87 is secured to the rod 88 in substantially the same manner as the arm 57 is secured to the rod 63, that is to say, by a split collar 99 and a tightening handle 100, provision being made for the conduction through the arm and rod of settle blowing air, in a manner later to be described.

Figure 4:
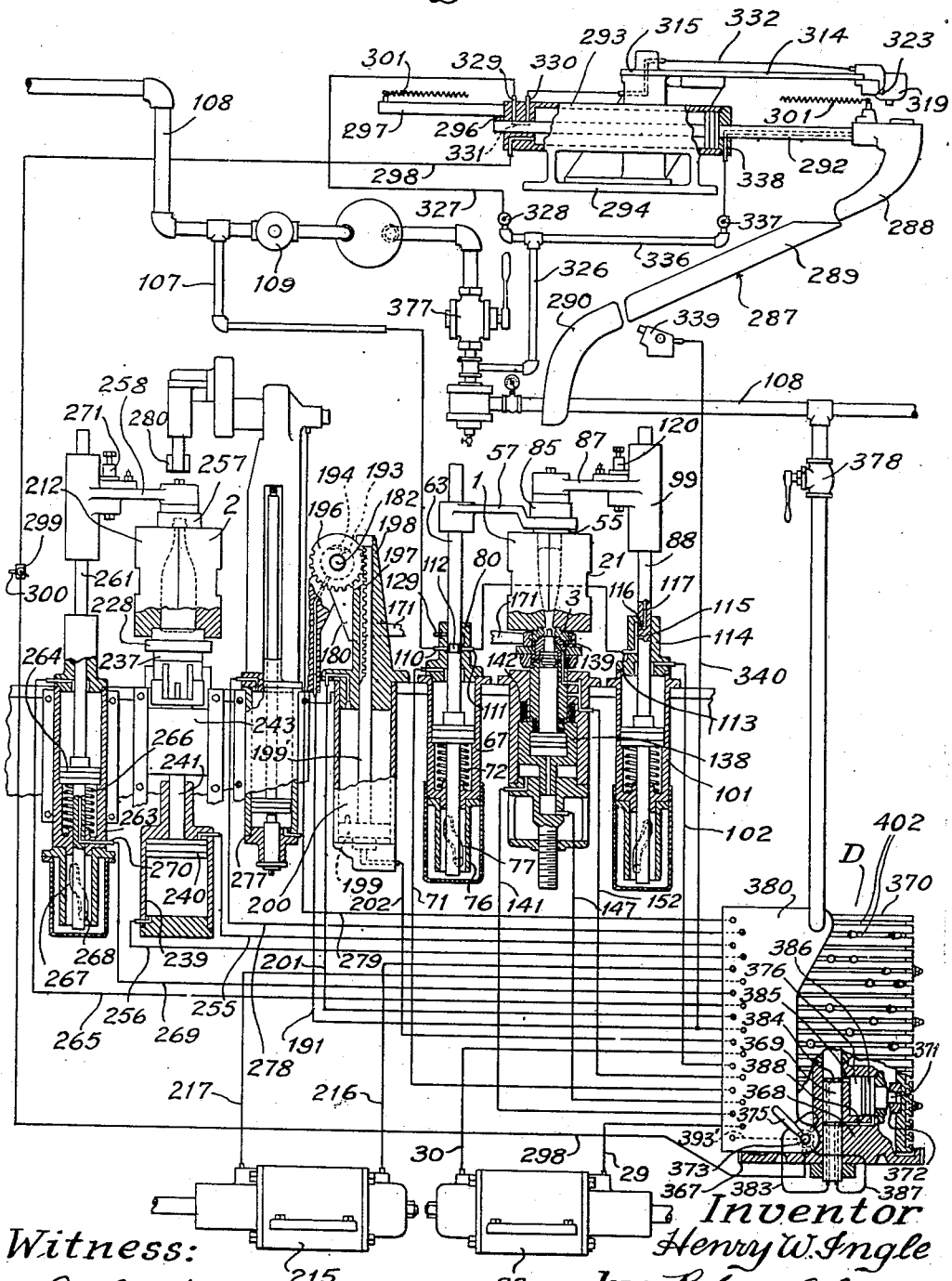
Fig. 4 is a view, mainly diagrammatic, with parts in section of the various mechanisms of a single section showing the piping connections for the operating pressure and showing in section the pneumatic clutch for engaging the timing drum.

Referring to Figs. 4 and 7, the means for moving the rod 88 and the blowhead or baffle 85 comprise a cylinder 101 having a pressure inlet pipe 102 leading thereto for moving the piston in a downward direction and the spring 103 for moving the piston upward. The lower end of the cylinder is also provided with an extension 104 having a helical groove 105 cooperating with a roll 106 on the rod 88 substantially as described previously with respect to the funnel operating cylinder 67 and its associated parts.

*Air pressure control for settle blow*

It is desired to use relatively high pressure air for settling the charge in the blank mold, and for this reason a pipe 107 is tapped off of the main air pressure pipe 108 (Fig. 4) on the high pressure side of the automatic reducing valve 109. This pipe 107 is led to a port 110 in the side of the upwardly extending portion 80 of the head of cylinder 67, which port is in communication with an opposite port 111 when the rod 63 and the funnel carried thereby are in their lowered or operative position; the rod 63 having an annular groove 112 formed therein registering with ports 110 and 111 when the rod is in its lower position. The port 111 communicates through a suitable pipe with a port 113 formed in an upwardly extending portion 114 of the upper head of the cylinder 101, an elongate opening or slot 115 being formed in the extension 114 to permit port 113 to be in registry with a lateral passage 116 formed in the rod 88 and communicating with a longitudinal bore 117 therein in the operative position of the blowhead 85 on the funnel 55. The elongate groove or slot 115 is used to insure registration when blowheads of various sizes are used and the rod 87 is consequently in a different vertical position during the operative position of the blowhead. Referring to Fig. 15, it will be seen that the collar 99 is provided with an elongate slot or groove 118 into which the passage 96 opens for communication with the lateral passage 119 communicating with the bore 117 of the rod 88. Thus it will be seen that the bore 96 is in communication with the bore 117 in any vertically adjusted position of the arm 87 on the rod 88, so that during the time the funnel is in operative position, settle blowing pressure will be conducted to the blowhead 85.

It may in some instances be desirable to prevent the passage of pressure to the blowhead 85 until a certain predetermined pressure is available and to cut it off quickly when this pressure is opened to exhaust, and for this purpose I provide a regulating valve, generally indicated at 120 (Fig. 15) and comprising a valve member 121 adapted to be pressed toward its seat 122 by a spring 123, the tension of which is adjustable by means of a suitable bolt 124. In order to provide for the smooth opening and closing of the valve, I preferably provide a dash pot device associated therewith, comprising an elongate stem 125 secured to or integral with the valve member 121 and extending into a cylindrical recess 126 formed in alignment with the direction of motion of the valve 121 toward and away from its seat 122. The stem 125 is provided with a collar 127 intermediate its ends having a snug sliding fit in the recess 126 and a collar 128 at its lower end fitting more loosely in the recess 126 and suitable fluid material, such as oil, is placed in the bottom of the recess 126 to a level above the upper position of the collar 128, thus providing an effective dash pot which insures the smooth opening and closing of the valve 121 without chatter.

After the completion of the settle blow and the raising of the funnel, the annular recess 112 will be moved out of line with port 110, thus cutting off the settle blowing pressure. The port 111 is, however, provided with an upwardly extending groove formed in the extension 80, which is at all times in communication with the annular groove 112. At the inoperative position of the funnel, the annular groove 112 will be opposite an exhaust port 129, thus exhausting any pressure in the passage between ports 111 and 113 and the system of ducts back to valve 120.

Neck plunger, thimble, and counterblowing mechanism

Counterblowing pressure is applied to the interior of the blank mold by the following mechanism: A vertical fluid pressure cylinder 130 (Fig. 5) is adjustably mounted below and in alignment with the parison mold 1, as for example by providing the lower head of the cylinder with a threaded bolt 131 which is adapted to be moved vertically by an internally threaded beveled gear 132 retained in a fixed vertical position by a spider 133 secured to the top of the box frame 9, gear 132 cooperating with a complementary beveled gear 134 secured to an inclined shaft 135 and having a squared end 136 accessible from the outside of the machine. Means are provided for holding the squared end 136 against rotation comprising a hinged bifurcated latch member 137 (Figs. 5 and 10).

Within the cylinder 130 is provided a piston 138 (Fig. 5) to which is removably secured the thimble member 139 by split collar members 140. Means are provided for moving the thimble up and down comprising a fluid pressure pipe 141 communicating with the bottom of the cylinder 130 and adapted to move the piston 138 upwardly and a series of spiral springs 142 arranged in an annular groove in the upper cylinder head and bearing on the piston 138 and adapted to move it downwardly in the cylinder 130 when the pressure beneath it is exhausted.

Within the piston 138 is formed a cylinder 143 in alignment with the cylinder 130 and adapted to receive a piston 144 having a neck pin or plunger 145 removably secured to the upper end of its piston rod, as by the split collar members 146. Means are provided for moving the piston 144 in its cylinder 143 comprising a pneumatic pressure pipe 147 communicating with a well 148 formed in the lower head of the cylinder 130. The piston 138 is formed with a downwardly extending portion 149 sliding in the well 148 and having a longitudinal passage 150 therethrough establishing communication between the well and the lower portion of cylinder 143. Thus it will be seen that pressure entering through the pipe 147 will pass directly to the bottom of cylinder 143 to force the piston 144 upwardly therein, thus moving the neck pin 145 upwardly with respect to the thimble 139. Suitable means, such as an annular series of spiral springs 151, may be provided in the upper part of the piston 138 bearing against piston 144 and tending to move it downwardly in its cylinder 143. Thus it will be seen that by suitable control of the pressure through pipes 141 and 147, any desired simultaneous or selected movements of the neck pin 145 and thimble 139 may be had. It is also obvious that when a parison of a different type is desired, requiring the use of a different type of parison mold, it is possible to remove the neck pin and thimble and insert a different one without loss of an excessive amount of time.

Means are provided for conducting blowing air from a suitable pipe 152 to the neck of the parison to be formed, comprising a duct 153 formed in the thimble 139 and communicating with an annular groove 154 in the thimble. This is adapted to be in communication with the pipe 152 in either the raised or the lowered position of the thimble, as by providing two passages commuicating with pipe 152, as shown in Figs. 4 and 5, one communicating with the annular groove 154 in the raised position of the thimble, and the other, in the lowered position thereof. Thus it will be seen that it is possible to counterblow the parison with the thimble in either raised or lowered position, it being understood that in either case the neck pin or plunger 145 is withdrawn downwardly out of the neck of the parison.

In Fig. 15 I have shown a modified construction of the thimble and neck pin operating mechanism, which is a preferred form. This form has several points of difference from the form just described, including first the mounting of the cylinder 130, which is supported by the base rather than the top of the box-like member 9 and is slidable through a suitable ring 155 secured to the top of the box member 9, the means for raising and lowering the cylinder 130 in the base of the machine being substantially the same as that already described. Above the gear 132, as shown in Fig. 15, is mounted a guard member 156 which prevents the flexible pipe 152, which enters adjacent to the bottom of the cylinder 130 in this form, from contacting with the gear and being cut thereby. The internal construction of the cylinder 130 is similar to that just described with the exception that single spiral springs 157 and 158 are used respectively for moving the pistons 138 and 144 downwardly. Suitable vents 138' and 130' are provided to permit the movement of pistons 138 and 144 in cylinders 130 and 143 respectively. These vents also serve the purpose of preventing air used in moving these pistons from leaking along them and up into the space between piston rod 165 and the thimble into the parison and also between the thimble and the neck ring into the parison, thus preventing the passage of air to the parison except through the usual counterblowing passages 166. Another difference in the internal construction of the cylinder is that in this form, the counterblowing air is conducted centrally upwardly through the stem of the neck pin or plunger for cooling it, the piston 144 being provided with a tube 159 extending downwardly through the lower head of the piston 138 which also forms the lower head of cylinder 143, and being received within a suitable well 160 similar to well 148 previously described. For the purpose of preventing pressure entering the lower end of cylinder 130 through pipe 141 from passing to the well 160 and thence through the tube 159 to the parison, I provide an annular groove 161 in the wall surrounding the tube 159 communicating through a passage 162 and a suitable tube (not shown) with the atmosphere outside the box-like member 9. Thus it will be seen that counterblowing pressure is only admitted to the parison at the specific time desired. The bottom of the piston 138 is provided with a tube 163 communicating between the lower portion of the cylinder 143 and a well 164, and that in turn has connected thereto pipe 147 for the purpose of conducting pressure to the cylinder 143 to move the piston 144 upwardly against the action of spring 158 and thus move the neck pin into the neck ring 3. The counterblowing air passing upwardly through the rod 165 of piston 144 is conducted laterally therefrom through passages 166 and thence through undercuts 167 which are opposite the narrow portion of the neck pin during the lowered position thereof while counterblowing. The pressure of the counterblowing air may be controlled in a manner similar to that of the settle blowing air by means of a spring pressed adjustable check valve, generally indicated at 168 (Fig. 10), this valve being preferably of the same design and provided with a dash pot in the same manner as the valve 120 shown in Fig. 15.

*Parison forming operations*

At the termination of a molding operation in the parison mold 1, the neck pin 145 is elevated by admitting fluid under pressure into the cylinders 143 and 130 respectively through the pipes 147 and 141. As soon as this is accomplished, the next mold charge may be delivered to the blank mold and settle blown by the mechanism described above. After the settle blowing operation, the blowhead 85 is raised and moved to some extent to one side to a position permitting the raising and removal of the funnel 55 to its inoperative position, which is then done by the operation of its cylinder 67, and the blowhead 85 is again brought down, this time into operative relation with respect to the mold 1 to act as a bottom plate or baffle for the counterblow. During these latter movements, the neck pin 145 is moved downwardly by the spring 158 due to the exhausting of the opposing pressure in cylinder 143 back through pipe 147 by the pressure controlling means later to be described. Counterblowing pressure is then admitted through pipe 152, well 160, tube 159 and the passages 166 and 167 around the neck pin 145 and into the parison to counterblow it. The passage of pressure through the piston rod 165 of the neck pin and through the passages 166 serves to cool the neck pin as much as is necessary to prevent its deformation through contact with the hot glass. This cooling preferably takes place during the inversion of the neck ring, and may be continued during the reversion thereof and up to the time a new mold charge is introduced into the parison mold 1, the admission of cooling air being controlled by suitable means on the timing drum in the same way as the control of the blowing air, and the cooling air being conducted through the same passages as are used for the counterblowing air. The mold halves 10 are then cracked open by mechanism similar to that described above, associated with the cylinder 28 either before or after the blowhead 85 has been raised and swung to one side, as desired. This movement of the blowhead to an inoperative position is the next in the series of steps and, as has been stated, may be either before or after the cracking of the mold halves, according to whether or not the parison tends to stick to the mold halves. Previous to the cracking open of the mold halves, the counterblowing pressure has been shut off and the chilled skin of the parison is permitted to reheat to some extent. The blowhead being now moved to one side, the parison mold is opened wide by admission of fluid pressure to the cylinder 28 through the pipe 30 and the parison is supported solely by the neck ring 3 and is adapted to be moved thereby to the final blowing position, the neck pin and thimble being in their lower position at this time. In some cases the parison is held for an instant in this inverted position to permit the reheating thereof to continue and to prevent the undue elongation of the parison, this interval being controllable in a manner later to be described.

*Neck ring and means for retaining halves in holders*

The neck ring 3, as best shown in Figs. 3, 4, 5 and 15, comprises two complementary sections 169, each of which is provided on its outer arcuate surface with a flange or tongue 170 for engagement with a similarly shaped groove provided in the arcuate extremity of one of a pair of horizontally extending arms 171. I have shown in Fig. 20 a preferred method of retaining the neck ring halves 169 in the ends of the arms 171 comprising a pin 172 adjacent to one side of each of the halves and receivable in a suitable recess therein and a latch 173 in each arm substantially opposite the pin 172 and spring pressed to the position shown in Fig. 20 by the spring 174. These latches are preferably pivoted on vertical pintles 175 and are prevented from excessive movement in either direction by pins 176 fixed in the arms 171 and protruding through enlarged apertures (shown in dotted lines) in the latch members 173. These latch members are provided with inwardly directed lugs 177 coacting with suitable recesses in the neck ring halves 169. Suitable clearances are provided to permit slight floating movements of the neck ring halves whereby they may position themselves properly with respect to each other and to the parison or blow molds. The neck ring halves are preferably provided with meeting surfaces on two planes, similar to the arrangement shown in Fig. 19 in connection with the halves 10 of the parison mold.

Means for supporting, opening and closing neck ring holders

Each of the arms 171 is provided at its inner end with a vertically extending groove 178 of T-shape in cross section (Figs. 2 and 3) for adjustable sliding engagement with a tongue or track 179 of similar cross sectional shape provided on each of a pair of depending arms 180. Suitable bolts (not shown) are provided to clamp the arms 171 to the arms 180 at the desired adjusted operating height, thus not only insuring an accurate joint between the neck ring and the blank mold, but permitting the use of molds of varying sizes according to the type of ware being produced. The bottom portion of the parison mold is shown in Fig. 5 as being exactly the same distance below the horizontal axis of inversion of the neck ring as the top portion of the blank mold is above it, this being accomplished in the construction of the molds themselves rather than by any particular adjustment of the other parts.

The arms 180 are each carried by one of a pair of opposed fluid pressure cylinders 181 (Figs. 3 and 5) which are slidably mounted on a rock shaft 182 journaled in bearings 183 on the box-like member 9 and at a point intermediate the blank mold 1 and the blow mold 2. The inner ends of the cylinders 181 are open and cooperate with a common piston 184 which is fixed to the shaft 182 by means of a suitable pin or set screw 185. The cylinders 181 are preferably splined to the piston 184 by means of feather keys 186 which prevent the cylinders from rotating on the piston but permit them to slide thereon in an axial direction.

The cylinders 181 are yieldably held toward each other normally to maintain the sections of the neck rings together by means of coil springs 187 which surround the shaft 182 between the bearings 183 and the cylinders 181, and which also surround the hub portions 188 provided on the cylinders 181. The cylinders 181 are preferably provided with integral cup-shaped portions 189 telescoping with complementary cup-shaped portions 190 fixed to and rotated with the shaft 182 at both ends thereof, so as to prevent the ingress of foreign material to the space in which the springs 187 are located. Fluid pressure is admitted to the cylinders 181 simultaneously in order to force them apart and open the neck ring to release the blank at the proper time, through a pipe 191 (Fig. 4) which communicates with a passage 192 extending axially through one end of the shaft 182 and is suitably plugged at its outer end. The passage 192 is connected with a radially extending passage 193 having an arcute groove portion 194 communicating therewith as shown in Fig. 4, whereby the passage 193 and the groove portion 194 will be in registration with the upper end of pipe 191, formed as a bore in one of the bearings 183, when the neck ring is at and near its position for depositing the parison in the blow mold. In practice, the neck ring is swung completely over into its ware-depositing position at the blow mold, the blow mold is closed about the parison, and pressure is then admitted through the pipe 191 from the timing means later to be described, through the passages 193 and 192 to the space between the piston 184 and the cylinders 181, suitable passages 195 being provided through the piston 184 for conducting pressure to both cylinders 181 simultaneously. The pressure is exhausted from the cylinders during the first part of the reverting movement of the neck rings, thus saving time over a construction in which the port 193 communicated with the bore in the bearings 183 only at a given point. During the time the neck ring is in operative position with respect to the parison mold, it is clear that pressure cannot be admitted to the cylinders 181 to open the neck ring.

Neck ring inverting means

The piston 184 is provided intermediate the cylinders 181 with a segmental gear 196 (Figs. 3, 4 and 5) which is adapted to be rotated to invert the piston and neck ring, by means of a rack 197 movable vertically in a suitable support 198 and mounted on or integral with the piston rod 199' of a piston 199 in a cylinder 200, shown in detail in Fig. 16. Fluid pressure is conducted to the top of this cylinder through a pipe 201 and to the bottom thereof through a pipe 202, suitable air cushioning means and check valves being used, as described above in connection with the blank mold operating cylinder 28, shown in detail in Fig. 14.

Special means are, however, provided in this cylinder 200 for varying the piston stroke, preferably in both directions, and comprising one or more suitable shims 203 of desired thickness adapted to be inserted between the lower bushing 204 and the bottom of the cylinder. This bushing is provided with a suitable opening 205 communicating with the pipe 202 and cooperating with the taper plug 206 to provide an air cushion, in the manner described above. The check valve, generally indicated at 207, is used to admit relatively large amounts of pressure to give a quick start to the upward movement of the piston 199 and may be of a slightly different design than that of the check valve members 54 above described, for example, it may comprise a valve member 208, shown in detail in Fig. 17, which is tapered on the bottom instead of being flat. By adding a larger number of shims 203, the piston 199 is prevented from moving downward as far in the cylinder 200 and the position of the neck ring at the blank forming station is raised.

In a somewhat similar manner, means may be provided for varying the top end of the piston stroke as, for example, by the insertion of suitable shims 209 between the collar 210 which is positively fixed to the piston rod 199' and the piston itself. The piston 199 is pressed against the collar 210 and the shims 209 by a suitable nut 211 threaded on the lower end of the piston rod. Thus it will be seen that by the insertion of shims 203 and 209 of suitable numbers and thicknesses, the endmost positions of neck ring inverting mechanisms may be varied at will, this adjustment being useful both in the initial setting up of the machine and later on to compensate for wear of the various parts.

Geometrical relations of parts during transfer

The geometrical relations of the neck ring support, the center of gravity of the parison, and its path of travel during the inversion are fully set forth in my prior application, Serial No. 743,531, filed October 14, 1924, and, therefore, it is thought that no further description of this subject matter need be given at this time.

Blow mold and operating mechanism

When the neck ring 3 is actuated as described to transfer a formed blank or parison to the finish blowing station, the blank is deposited in the open blow mold 2 in a neck-up position. The blow mold 2, in the present instance, is fixed in position and comprises two cooperating sections 212 which are detachably secured to the mold holders 213, preferably in the manner described in connection with the supporting of blank mold halves 10 in the blank mold holders 14 and shown in detail in Fig. 22. The mold holders are hinged upon a pin 214 which is carried by the box-like member 9.

The blow mold 2 is opened and closed at proper times by means of fluid pressure admitted to a cylinder 215 (Figs. 4, 7, 8 and 9) through pipes 216 and 217. The mold cracking means comprising parts 43 to 48 inclusive is shown in connection with cylinder 215, but is an exact duplicate of that used in connection with the blank mold operating cylinder 28. Cylinder 215 is provided with a piston 218, piston rod 219 of which is connected by a link 220 to one arm of the rocking beam 221. The latter is connected by links 222 and 223 to the cranks 224 which are secured respectively to the lower portions of vertical shafts 225 in a manner similar to that described in connection with the blank mold operating linkage. The upper ends of the shafts 225 have adjustably secured thereto cranks 226 (Fig. 3) which are connected by links 227 to the blow mold holders 213 in the same manner as was described previously with respect to the blank mold. In the case of both of these molds, the cranks 40 and the links 42 in connection with the blank mold 1 and the cranks 226 and links 227 in connection with the blow mold form toggles to lock the mold halves together in their closed position. The same adjustments may be made between cranks 226 and shafts 225 to take up backlash, as described above in connection with the blank molds 1.

Final blow bottom plate

The final blow mold 2 is provided with a suitable bottom plate 228 (Figs. 4 and 5, a modification of which is shown at 228a in Figs. 22 and 24). Suitable means are provided for adjusting this bottom plate vertically to cooperate with molds of various sizes, for removing it and substituting other types of bottom plates for various types of molds (two types of molds and bottom plates being shown herein) and for lowering and tilting it to dump cullet or other foreign matter therefrom.

The vertical adjusting means for the bottom plate comprise a lug 229 (Fig. 5) which is fixed to the bottom plate operating mechanism and which received a threaded bolt 230 therein, the upper end of which is squared to receive a wrench and the lower end of which bears against the base 4 of the machine, whereby rotary motion of the bolt 230 will elevate or depress the bottom plate and its operating mechanism as an entirety. The bottom plate mechanism is suitably received for this vertical sliding motion in a vertically extending recess 231 in the box-like member 9, as best seen in Fig. 23, and is confined in this recess by vertical guide members 232 suitably secured by bolts 233 to the member 9.

Suitable means are provided for holding the bottom plate 228, shown in Fig. 5, or the modified bottom plate 228a, shown in Figs. 22 and 24, to the support, comprising a bayonet joint device formed by a rotatable sleeve 234 adapted to engage over flanges 235 on the bottom of the bottom plate 228a, as best seen in Fig. 24. A suitable spring pressed detent 236 is provided for the purpose of preventing accidental rotation of the sleeve 234 and resultant dislodgment of the bottom plate 228a. The bottom plate 228a is prevented from rotating with respect to the base member 237 by a cooperating tongue and groove connection 238 (Fig. 24) between these two parts. Similar means may be employed for securing bottom plate 228 to its support, as shown on a smaller scale in Fig. 5.

Means are provided for moving the bottom plates from their operative positions with respect to the mold first vertically downward with a rectilinear movement and then for tilting them for the purpose of dumping any cullet or misformed glass article therefrom. This moving means comprises a cylinder 239 having a piston 240 therein, the rod 241 of which extends vertically upward through the head of the cylinder and is provided at its top with a member 242 (Figs. 4, 5, 22 and 24), the bottom portion 243 of the member 242 being used as a shield to prevent the ingress of fine glass or other foreign matter into the bearing about the piston rod 241, and the upper portion of the member 242 being formed with two parallel upstanding arms or brackets 244, which serve normally to support the base member 237 of the bottom plate in a horizontal position, as shown in Figs. 22 and 24. Means are provided for retaining the base member 237 in horizontal position upon the upwardly extending brackets 244 comprising one or more springs 245, two of which are shown, connected between hooked members 246 (Fig. 24), which engage over a rod 247 mounted in the base member 237, and suitable anchorages 248, (Figs. 5 and 22) fixed to a rear slide member 249 which is rigid with the cylinder 239. The base member 237 is provided with outwardly extending pins 250 which may be extensions of the rod 247, these pins preferably being flattened on their sides to cooperate with a pair of short vertical slots 251 formed in the upper portion of the slide member 249. The member 242 is connected to the front of the base member 237 by a pair of links 252 pivotally connected to the upwardly extending brackets 244 of the member 242 at 253 and to the base member 237 at 254. Fluid pressure is conducted to the cylinder 239 to operate the piston 240 through an upper pipe 255 and a lower pipe 256.

From the above description of the mechanism for operating the bottom plates, the operation will be obvious. Starting with the piston 240 at the upper end of the cylinder 239, as shown in Fig. 5, the initial downward movement of the piston will move the base member 237 and the bottom plate 228 or 228a secured thereto vertically downward with a rectilinear movement due to the lowering of the brackets 244 and the pull of the springs 245 which tends to keep the base member 237 horizontal on the brackets, this movement continuing until the pins 250 have reached the bottom of the slots 251. Continued downward movement of the piston 240 will tilt the bottom plate about the axes of the pins 250 as an axis, through the pull exerted thereon through the links 252 and against the tension of the springs 245, thus allowing any glass or material thereon to be dumped from the bottom plates. On upward movement of the piston 240 in the cylinder 239, the bottom plate and its supporting base 237 will be rocked back again about the axis of tilt above described until the bottom plate reaches a horizontal position, this being insured by the tension of the springs 245, which will hold the axis until the entire base 237 is evenly supported upon the brackets 244. Thereafter, the bottom plate will be moved vertically upward, by the engagement with the brackets 244, to its operative position with respect to the blow mold. This latter movement may be utilized, when using a bottom plate of the type shown in Figs. 4 and 5 at 228, as a push-up bottom plate, which will contact with and push upwardly the lower end of a parison in the blow mold subsequent to the closing of the mold. The bottom plate 228a, on the other hand, must be in its uppermost operating position prior to the closing of the mold, as it has interengaging flanges with the mold halves, (Fig. 22). It will be understood that the pipes 255 and 256 for the opposite ends of the cylinder 239 lead to the timing drum, and pressure may be admitted thereto in any desired timed relationship with respect to the movements of the other parts to accomplish the desired result with the various types of bottom plates.

*Final blowhead and operating mechanism*

The upper portion of the blow mold is adapted to be closed by blowhead 257 (Figs. 3, 4, 5, 6 and 22), which is detachably secured to a hollow arm 258 in any suitable manner, as by the bayonet joint connection shown at 259 (Fig. 22), this connection being substantially the same as that described in detail in connection with the baffle 85. Suitable provision may be made for permitting a limited floating movement of the blowhead 257 and for guiding it against excessive angular displacement as by an arm 260 substantially similar to arm 97 described above in connection with the baffle. The blowhead arm 258 is adjustably secured to a vertically disposed rod 261 as by a squeeze bolt operable by a handle 262 similar to the construction above described in connection with the funnel and baffle arms. A suitable operating cylinder 263 having a piston 264 therein fixed to the rod 261 may be used for imparting vertical movements to the blowhead. The piston is adapted to be moved downwardly by fluid pressure entering at the top of the cylinder through pipe 265 and to be moved upwardly by a suitable helical spring 266 (Fig. 4). Lateral movements are given to the blowhead in response to the vertical movements by a helical slot 267 formed in an extension secured to the lower end of the cylinder 263 and a pin 268 fixed to the rod 261 cooperating with the slot. This mechanism is preferably the same as that shown and described in detail in connection with the funnel and baffle operating cylinders.

Final blowing pressure is conducted through a pipe 269 to a port 270 in the lower head of cylinder 263, which port is in registration with a lateral passage in the rod 261 when the blowhead is in blowing position with respect to the mold (Fig. 4); and the rod 261 is provided with a bore therethrough which communicates with the interior of the hollow arm 258 in a manner substantially the same as that shown in detail in Fig. 15 in connection with the settle blowing baffle. A suitable pressure control valve 271 of the same design and for the same purpose as the valve 120 shown in detail in Fig. 15 and described in that connection may be provided in the hollow arm 258.

Take-out mechanism C

A suitable take-out mechanism C is shown in Figs. 1, 2, 3, 4 and 6. This mechanism comprises an actuator unit, generally indicated at 272, which is vertically slidable in suitable ways formed in the front end of the box-like base 9, guiding means being shown at 273 (Fig. 6), tong arm and suitable tongs. Means are provided for adjusting the entire mechanism 272 vertically with respect to the fixed parts of the machine and comprise a lug 274 formed on the structure of the member 272 and having threaded therein a jack screw 275 bearing upon a suitable part 276 rigid with the base 4. The details of the take-out mechanism constitute a separate invention of myself and another and hence will not be disclosed here other than to say that the mechanism is operated in part by a cylinder 277 (Fig. 4) to which are conducted fluid pressure pipes 278 and 279, the pipe 279 also serving to admit pressure to a separate mechanism for the purpose of closing the tongs 280.

The scavenging bottom plate hereinbefore described has a peculiar cooperation with the take-out tongs in that the tongs are normally intended to remove from the final blow mold each perfectly formed article, but if the tongs fail to function or if an article is deformed or broken in the final blow mold, the bottom plate will be effective to throw it out and thus effect a separation of the good ware from the bad. This protects the final blow mold against damage due to closing on chilled and broken glass.

The take-out mechanism C is designed to place the formed particles upon a suitable conveyor 409, (Fig. 2) extending transversely of the forming machine and operated in timed relation therewith through a suitable interconnecting means shown as a shaft 410 having universal joints 411 and 412 and extending between the driving drum 413 of the conveyor 409 and a suitable speed changing mechanism 414 which receives power from the shaft 361 or some other suitable source of power operated in timed relation with the forming machine. It is obviously possible by suitable ratio of speeds between the shaft 361 and the driving drum 413 and a consideration of the diameter of this drum, to determine the linear velocity of the conveyor 409 so that the ware placed thereon at one section will not interfere or be interfered with by that placed thereon at another section. However, it is sometimes desirable, especially in making various types of ware in the several sections, to insure the removal of the ware of one kind adjacent to each section prior to its passing along in front of the next section, and for this purpose, I provide deflectors 415 which may be suitably arranged at an angle with the direction of movement of the conveyor 409 and at suitable spaced intervals therealong for deflecting articles of one type off the conveyor before they are intermingled with those of another type.

Cooling means

The machine shown and described in this case comprises four sections A arranged side by side, and means are provided in connection therewith for cooling the various parts as much as is necessary and preferably for selectively cooling the mold halves variable amounts subject to the will of the operator. These means comprise relatively large pressure controlling chambers, shown as vertically cylindrical pipes 281 (Figs. 2, 3, 6 and 7), one for each section of the machine and, as shown, two arranged at each side of the machine. These pipes or chambers are adapted to be connected with a suitable source of air under pressure, such as a centrifugal blower (not shown), and are usually provided with pressure indicating means of some conventional type (not shown). Suitable dampers, as shown at 282 (Fig. 2) are provided for controlling the passage of air through the pressure control chambers 281. The chambers 281 communicate with the several sections respectively through passages best shown in dotted lines in Fig. 2 at 283 and 284 and thence are conducted upwardly into the several box like bases 9 through openings 285 which are partially closed, as shown in Fig. 8, by the mold opening and closing cylinders 28 and 215. The box-like bases 9 constitute plenum chambers for the cooling air and are entirely shut off from the atmosphere with the exception of the passages for the ingress and egress of the cooling air. These latter passages are shown as nozzles 286 and are provided with suitable dampers (not shown) for selectively controlling the amount of air passing through each nozzle. These nozzles 286 are directed one toward each half of each of the blank and blow molds 1 and 2 respectively. Thus it will be seen that the mold opening and closing mechanisms and several of the other operating cylinders which are disposed within the plenum chambers will be cooled by the cooling air filling and passing through these chambers, and also that the mold halves may be cooled as much or little as desired by suitable control of the dampers associated with the nozzles 286.

*Charge distributing means B*

The delivery mechanism B which conveys the mold charges to the several shaping machines A is supported by a suitable frame structure 8, as hereinbefore described, and comprises a plurality of troughs or guideways generally indicated at 287 which extend radially from a point beneath the outlet of the feeding device E to the several shaping machines or sections A (Figs. 1 and 2). The glass feeding device is adapted to deliver molten glass in successive mold charges of predetermined size and shape, which are cut off by suitable shears and may comprise any suitable mechanism for performing this function.

Each of the guideways 287 comprises a horizontally reciprocable trough section or scoop 288 which intercepts the mold charges issuing from the feeder opening and cut off by the shears; a vertically adjustable trough section 289 which conveys the mold charges to the shaping machine, and a laterally adjustable deflector 290 which directs the mold charges accurately into an awaiting mold 1. Each of the movable trough sections or scoops 288 is carried by a bracket 291 (Fig. 12), which is mounted upon one end of a horizontally reciprocable piston rod 292. Each of the piston rods 292 extends entirely through a fluid pressure cylinder 293, which cylinders are mounted upon a bracket 294 carried by a transversely extending supporting beam 295 which is mounted upon the frame structure 8 (Figs. 1 and 2). Each piston rod 292 is prevented from rotating and displacing its scoop 288 by means of a pin 296 (Fig. 4) which extends transversely through the piston rod 292 for engagement with the guide 297 provided in a housing formed on one of the heads of each of the cylinders 293.

Referring now to one section as an example of all, the scoop section 288 is projected in a rectilinear path to a position beneath the discharge opening of the feeding device and in alignment with the trough section 289 in order to deliver a mold charge to the shaping machine, by means of fluid pressure, which is admitted to the cylinder 293 from a pipe 298 and controlled by the pressure control device later to be described (Fig. 4). The pipe 298 is provided between the cylinder and the pressure control device with a manually controlled three-way valve 299 effective either to open a passage between the pressure control device D and the cylinder 293, or to open the pipe connection 298 to the cylinder 293 to an exhaust port 300, and close off the connection with the pressure control device D. At the conclusion of the delivery operation and as soon as the pressure within the cylinder 293 has been relieved, the scoop section 288 is withdrawn from operative position with respect to the feeder opening and the trough section 289 or charge intercepting position by means of one or more springs 301, which are secured at one end to the piston rod 292 and at the other end to the extension or guide 297 on the cylinder 293. These springs positively maintain the trough or scoop section 288 in a retracted position with respect to the outlet of the feeder when the operation of the machine is discontinued or in the event of failure in the pressure supply. It will be understood in this connection that the scoops 288 of the several guideways 287 operate in succession when a single feeding device is employed and in timed relation with respect to the action of the feeding device, as hereinafter to be described, in order to deliver mold charges successively to the several shaping machines.

Each of the trough sections 289 is detachably hinged at its upper end, as at 302, to a transversely extending curved bracket 303, and is supported at its lower end for vertical adjustment by a screw 304 carried by a bracket element 305 (Fig. 1), to which the deflector 290 also is secured by a two point support 306. The bracket element 305 is suitably supported for universal movement in a horizontal plane as by a vertically extending bolt 307 extending through the element 305, an intermediate member 308 and a bracket 309 fixed with respect to the frame structure 8 of the machine. Suitable means, such as screws 310 and 311 (Figs. 1 and 2), are provided for adjusting the bracket 305 with respect to the bracket 309, in two perpendicular horizontal directions, these screws being threaded in suitable lugs on the brackets 309 and 305 respectively and having their inner ends bearing against the intermediate member 308. By suitably adjusting screws 310 and 311, the bracket 305 and the lower end of the chute member 289 and the deflector 290 may be shifted horizontally in suitable directions in order properly to align the lower end of the deflector 290 with the blank mold 1. A suitable chute 312 (Fig. 1) is carried by the transversely extending bracket 303 and has its upper end positioned directly beneath the discharge opening of the feeding device E and its lower end directed into the cullet pit 313 to deflect thereinto charges which are not intercepted by one or another of the scoops 288.

*Lubricating means for the distributing system*

Means are provided for supplying lubricating material, preferably a spray of oil and air, to the scoops 288 and comprise a lubricating arm 314 (Figs. 1, 2, 4, 11 and 12) having a series of spray nozzles at its outer end, one of which is adapted to cooperate with each of the scoops 288 to supply lubricating material to the glass-contacting surface thereof. This arm is preferably pivoted at 315 about a vertical axis fixed with respect to the supporting beam 295, whereby it may be swung to one side when desired to permit access to the discharge opening of the feeder for effecting any necessary repairs or for inspection, suitable latch means 315' being used to hold it normally in operative position. Oil may be used for lubricating the conveying means and is conducted from a supply pipe 316 (Fig. 12) through a suitable swivel connection 317 in alignment with the axis of swing of arm 314 and thence through a pipe 318 to a float level chamber 319 which is provided with a well known type of float operated valve 320. From the chamber 319 the lubricating material is conducted by a pipe 321 (Figs. 11 and 12) to each of the level chambers 322, one of which is shown in detail in Fig. 13. Thus there is a maintained lubricant level in each of the chambers 322. Spray nozzles 323 are provided at the outer end of the arm 314, one in alignment with each of the scoops 288, these nozzles comprising an outer nozzle member or bushing 324 and a lubricant conducting tube 325 leading from a point adjacent to the bottom of the corresponding level chamber 322 and having its outer ends disposed concentrically within the nozzle member 324. Air for spraying the lubricating material upon the scoops is conducted from the main supply line through a branch 326 and thence through a pipe 327 controlled by a suitable manually operable controlling valve 328 to an automatic valve comprising a pair of ports 329 and 330, (Fig. 4) formed in one head of the cylinder 293 and adapted to be connected by a groove 331 formed in the piston rod 292 when the scoop is at its outer or charge-receiving position. Port 330 is connected through suitable registering means in the bearing 315 with a pipe 332 (Fig. 4) leading to the annular space between the nozzle member 324 and the tube 325, as shown in detail in Fig. 13. Thus it will be seen that whenever each scoop 288 is in its outer or charge-receiving position, lubricating material will be sprayed thereon through the corresponding nozzle 323.

Means are provided for assisting the charges of glass in moving down the chute system 287 comprising an air nozzle disposed adjacent to the receiving end of each of the scoops 288 for blowing a relatively large blast of air down the glass contacting surface of the scoop in order substantially to blow the mold charge down the chute system and keep the chute cool for permitting its proper lubrication. This means comprises a substantially semi-circular nozzle 333 formed adjacent to the upper edge of the scoop 288 (Fig. 12) and communicating with an annular air passage 334 in the upper rim of the scoop, and that in turn communicates with the bore 335 of the piston rod 292 (Figs. 11 and 12). Air is conducted from the branch pipe 326, through a pipe 336 controlled by a manually operated controlling valve 337, to a port 338 in one of the heads of the cylinder 293 (Figs. 4 and 11). A lateral passage is formed in the piston rod 292 communicating between the bore 335 therein and the port 338 in the head of cylinder 293 when the scoop in at its outer or charge-intercepting position (Figs. 4 and 11). Thus, when the scoop 288 is in charge-receiving position, a blast of air will be blown down the scoop in a direction substantially tangential with the glass contacting surface thereof to assist in conveying the charge of molten glass down the chute system.

A further chute lubricating device may be used in conjunction with the deflectors 290 and may comprise a suitable float level chamber (not shown) similar to float level chamber 319 and communicating with each of the nozzles 339 (Figs. 1 and 4), it being understood that the construction of these nozzle members is the same as that of the nozzles and associated parts shown in Fig. 13. Air for spraying the lubricating material from the nozzle members 339 onto the deflectors 290 may be conducted from the timing system through a pipe 340 which is a branch of pipe 191 leading to the inverting means for opening the neck rings 3. Thus it will be seen that simultaneous with the opening of one of the neck rings 3 to deposit a parison in the blow mold 2, a spray of lubricating material will be projected onto the glass contacting surface of the corresponding deflector 290, thus preparing it for the next succeeding mold charge which is supplied thereto directly after the reverting movement of the neck ring 3, the closing of the parison mold 1 and positioning of the funnel 55 of that section.

*Timing and valve operating means D*

The various units or sections A of the combined forming machine hereinbefore described are severally and collectively timed with respect to the feeding device E and preferably are driven from a common source of mechanical power. Power is shown as being applied to both the feeding device and the forming machine from some suitable means as an electric motor 341 (Figs. 1 and 2) and thence through a suitable sprocket chain 342 running over sprockets 343 on the motor shaft and 344 on a shaft 345, and sprocket chain 346 operating over a sprocket wheel 347 on shaft 345 and 348 on a shaft 349 to which is also fixed a bevel pinion 350. Shafts 345 and 349 are used to operate the various mechanisms of the feeding device E. The bevel pinion 350 is adapted to mesh with a complementary bevel pinion 351 on a suitable inclined shaft 352 at the other end of which is a bevel pinion 353 which meshes with a complementary bevel pinion 354 on a shaft 355 mounted in suitable bearings fixed to the supporting beam 295. A suitable phase changing device or differential, generally indicated at 356, may be employed to change the relative angular positions of the shafts 355 and 357 (Figs. 1 and 2). The details of this differential may be the same as those shown in my copending application, Serial No. 735,079, filed August 30, 1924, or such phase changing device of any other suitable type. The shaft 357 has mounted thereon adjacent to its outer end a suitable sprocket 358 which is connected by a sprocket chain 359 with a driving sprocket 360 for the timing mechanism, sprocket 360 being fixed to the shaft 361 and mounted in suitable bearings in the frame of the machine. Means may be provided for tightening the sprocket chain 359 about sprockets 358 and 360 comprising a pair of sprocket wheels 362 and 363 (Figs. 1 and 10) mounted upon stub shafts on a suitable carriage 364 which is angularly adjustable with respect to the side frame member 7 and is adapted to be secured in any desired adjusted position by the bolts 365. Sprocket wheels 358 and 360 may be removed and interchanged with other sprocket wheels having different ratios, for a purpose hereinafter to be described, and the slack of the sprocket chain may be suitably taken up by proper adjustment of the member 364 on the frame member 7. The shaft 361 is provided with a plurality of pinions 366 (Figs. 5 and 10) which mesh with gear teeth 367 formed on members 368, one of which is provided with each section and which are freely rotatable upon shafts 369. One of the latter is provided for each section and is fixed in suitable supports mounted on the machine frame, such shafts preferably being in alignment one with another. Cam drums, generally indicated at 370, are also loosely rotatably mounted upon the shafts 369, one for each section, and are adapted to be clutched to the members 368 in predetermined angular positions relative thereto.

*Pneumatic clutch for each section*

I use a single tooth pneumatically operated clutch for connecting members 368 and 370 for simultaneous rotation about the shaft 369, this clutch comprising a clutch tooth or pin 371 (Fig. 4) which engages in a single recess in a ring 372 suitably secured to the member 370 as hereinafter described, and means for moving the pin 371 into and out of engagement with the recess in the ring 372. This means comprises a valve, generally indicated at 373 and shown in detail in Fig. 25, comprising a center plug 374 manually rotatable by a handle 375, and serving to admit pressure to the cylinder 376 at either end thereof according to the position of the valve. Pressure is admitted from the main supply pipe 108 (Fig. 4) through the pressure regulating valve 109 and past manually operable shut off valves 377 for the entire machine and 378 for the section to the pressure chamber 379 in the valve chest 380. From chamber 379 it passes through a bore 381 (Fig. 25) to the plug 374 of valve 373 and thence through the angle passage 382 in the valve plug and the pipe 383 to a longitudinal bore within the shaft 369 (Fig. 4) and thence through an angle bore to an annular groove 384 opposite this angle bore and thence through a port 385 (Fig. 4) to the inner or head end of the cylinder 376. Thus when the valve handle 375 is in the position shown in Fig. 25, pressure will be admitted to force the piston 386 forward in its cylinder to seat the pin 371 in the recess in ring 372. When the handle 375 is turned in a counter clockwise direction, as seen in Fig. 25, to its maximum extent, angle bore 382 is in position to connect the duct 381 with a pipe 387, and that in turn is connected with a second longitudinal bore in the shaft 369 which is similarly connected through a lateral bore and annular groove in said shaft with a port 388, communicating with the opposite end of cylinder 376, so that when the valve handle 375 is in its maximum counter-clockwise rotated position, pressure will be admitted from the pressure chamber 379 through duct 381, angle bore 382, pipe 387, the second longitudinal bore in the shaft 389, the annular groove, port 388 to the outer or crank end of the cylinder 376 to force the piston 386 inward or to the left, as seen in Fig. 4, so as to withdraw the pin 371 from its recess, thus permitting the continued rotation of the member 368 while the drum 370 is stopped. When one of the pipes 383 or 387 communicating with the plug 374 of the valve 373 is in communication with the duct 381 through the angle bore 382, the other of said pipes 387 or 383 is in communication with an exhaust passage immediately above it through a slot 389 formed in the valve plug, (Fig. 25) thus permitting the exhaust of air from one end of the cylinder 376 during the time that pressure is admitted to the opposite end.

Changing timing of sections for various numbers of sections in operation

The ring 372, as best shown in Figs. 4 and 21, may be secured to the inside of the drum 370 in a plurality of angularly different positions. Under normal conditions, the rings 372 are secured to the four drums 370 at positions 90° apart, it being assumed that the clutch pins 371 are all in a single radial direction. However, if it is desired to shut off one of the sections A of the forming machine, the other three sections may be adjusted at positions 120° apart, so that they will be operable at evenly spaced intervals one with another and so that they may be operated from a single feeder without wasting one out of every four charges of glass, by the simple expedient of changing the ratio of drive between the feeder and the forming machine, which may be accomplished by changing the ratio of spockets 358 and 360, as explained above. I have shown in Fig. 21 the means of securing the rings 372 to the drum 370 comprising a pin or screw 390 extending through the drum 370 and into one of a plurality of recesses 391 in the ring 372, it being understood that any desired number and spacing of recesses may be made, so that the drums 370 may be spaced in any desired angular relation with respect to the rings. Thus it will be seen that any desired number of units may be operated in evenly timed relationship one with another and with a feeding device, and if desired all four units or more, in case more are provided in a single forming machine, may be operated over only a part of a large cycle, thus permitting certain of the successive glass charges from the feeding device to be conducted to some other forming machine or used in any desired manner.

Timing mechanism for each section

The operation of different mechanisms of each of the individual shaping machines or sections, together with the devices which operate in connection therewith, is separately controlled by individual valve mechanisms which coordinate the operation of the machines or sections as an entirety and which insure that various functions, performed thereby, occur in proper sequence and in timed relation with respect to each other. These controlling mechanisms are best shown in Fig. 5. Each of the mechanisms embodies a valve chest 380 and the cooperating valve operating drum or cylinder 370 which is rotated in timed relation to the operation of the feeding device, as above explained. The valve chest is provided with a pressure chamber 379 with which communicate almost all of the pipes which deliver fluid pressure to the various operating cylinders and other mechanisms of the shaping machine. The transmission of operating pressure through the various delivery pipes is controlled by a series of similar valves 392 which are provided in the valve chest 380, and which are opened and closed in proper sequence by the drum 370. Inasmuch as all of the valves 392 are of similar construction and are operated in substantially the same manner, the description of one of these valves will serve as an example of all. As shown in Fig. 5, one of the delivery pipes, 29 for example, is conducted to the valve block 380, where a passage communicating therewith splits into a horizontally extending passage 393 and a vertically extending passage 394. The passage 393 communicates with a second horizontally extending passage 395 through a needle valve 396 which may be suitably adjusted to admit fluid pressure to the pipe 29 at the desired operating pressure. The passage 394 is connected with the passage 395 through a check valve 397 which opens to permit the quick exhaust of pressure from the pipe 29 past the check valve 397 to the passage 395. The valve member 392 comprises upper and lower valves 398 and 399 respectively, the former opening into the pressure chamber 379 and the latter opening to the atmosphere, the stem of the member 392 being fluted, thus permitting the passage of exhaust pressure from the passage 395 out to the atmosphere when the member 392 is in its lower position, as shown in Fig. 5, and permitting the passage of pressure from the chamber 379 through the fluted part of member 392 to the passage 395 and through the needle valve 396 to the operating mechanism when the member 392 is raised shutting off the exhaust by the positioning of the plug member 399 in the valve passage and opening the valve 398. Each of the members 392 is forced downwardly by a suitable spring 400 preferably located within the chamber 379 and extending between the valve head 398 and a suitable plug 401 in the top end of this chamber opposite the member 392. This construction is designed, so that the plug 401 may be removed and the valve member 392 drawn upwardly through the hole thus opened for replacement or repair. The drum 370 is provided with a plurality of circumferential slots 402 in which are located suitable pairs of studs 403 and 404 having T-heads for engagement within the slots 402 and being of different heights, the studs 403 extending a less distance from the axis of the drum 370 than the studs 404. Opposite each of the valve members 392 is a valve actuating member 405 which is pivoted at 406 to the frame of the machine and which is adapted to be engaged by the studs 403 and 404 and moved upwardly to contact with and push upwardly the member 392, thus opening the corresponding valve 398 to pressure and closing the corresponding exhaust valve 399. The members 405 are adapted to be engaged in their upper position by spring pressed latches 407 which depend to positions adjacent to the drum 370. The operation of the device is as follows—When the short stud 403 on the drum 370 in alignment with a particular member 405 engages the lower inclined surface thereof, this member is pushed upwardly until the latch member 407 engages therewith, thus locking open the corresponding valve 392 to pressure and closing the exhaust passage and, in the example here shown, admitting pressure through the needle valve 396 to the pipe 29 which would close the blank mold. This condition is maintained until the longer stud 404 contacts with the lower inclined portion of member 405 pushing the member upwardly, but not changing the position of the valve 392. However, the member 404 is sufficiently long to engage with and trip the lower end of the latch member 407, thus freeing the member 405 and permitting the valve member 392 to be forced downwardly by the spring 400 and closing the valve 398 to pressure and opening the valve 399 to exhaust, which passes out from the cylinder 28 through the pipe 29, passage 394, check valve 397, passage 395, the fluted part of member 392 and the valve 399 to the atmosphere. The bottom one of the valves 392, as seen in Fig. 4, communicates through a passage indicated by the dotted line 393′ with the valve 373, as shown more in detail in Fig. 25, and thence through the angle passage 393″ with the pipe 298 extending to the cylinder 293 for operating the scoop 288. In the off position of the valve 373, the pipe 298 communicates through the angle passage 393″ with a suitable exhaust port (not shown). Thus it will be seen that when handle 375 is turned to throw out the clutch, the cylinder 370 will be stopped to permit the various parts of the ware-forming machine to stop in the position in which they then are and the pipe 298 will be opened to exhaust, thus permitting the withdrawal of the scoop 288 to its inoperative position by the handle 281. In starting the section again, it is desirable to open the valve 299 to exhaust, thus retaining the scoop 288 of that section in an inoperative position while the handle 375 is turned to the position shown in Fig. 25 to engage the clutch pin 371 and start the drum 370 rotating and thus start the operation of the various parts of the machine; then after these machine parts have started to operate in their properly timed relationship with the feeding device and the other sections of the forming machine, the valve 299 may be turned to permit pressure to flow through the pipe 298 from the valve 373 to the cylinder 293 in the usual way and the machine will then be in full running operation. It is noted that a single valve will stop the machine while two valves most usually will be operated in the starting of the machine.

In Fig. 27 I have shown a slightly different relation of parts in the valve chest comprising a ball check valve permitting exhaust only through the needle valve 396 and permitting pressure admitted to the pipe 29 to pass either through the needle valve 396 or past the ball check valve 408. The purpose of this is to limit the exhaust from the cylinders rather than limiting the entering pressure by the needle valves 396. This prevents the phenomenon known as "coasting" and is especially useful in connection with the transfer, take-out and bottom plate operation or in fact in any connection where air pressure is used on both ends of a cylinder to force the piston in both directions.

While I have shown and described but one embodiment of my invention, it is obvious that many modifications might be made therein and many of the individual features might be used in other combinations without departing from the spirit of the invention as set forth in the appended claims which are to be construed as broadly as the state of the prior art permits.

I claim:

1. The combination with a single glass feeding device of a ware forming machine comprising a plurality of independent sections, each operable in timed relation with respect to said feeding device, means for distributing charges of glass from said feeding device to each of said sections, including an independently actuated charge intercepting member for each section adapted to be moved automatically into and out of charge-receiving position with respect to said glass feeding device, independent means for timing and operating the various mechanisms of each section, a clutch interposed between said timing and operating means of each section and said feeding device by which any of said sections may be rendered inoperative, and a lever for each section adapted by a single movement during the operation of said section to disengage the clutch of that section to stop the operation thereof and to release the charge intercepting member of that section from the forces causing its automatic actuation, whereby it may be moved immediately to an inoperative position.

2. The combination with a single glass feeding device of a ware forming machine comprising a plurality of independent sections, each operable in timed relation with respect to said feeding device, means for distributing charges of glass from said feeding device to each of said sections, including an independently actuated charge intercepting member for each section adapted to be moved automatically into and out of charge-receiving position with respect to said glass feeding device, the actuating means for said members each comprising a pneumatic cylinder operative to move said member to its charge-receiving position and a spring operative to withdraw said member to an inoperative position when the pressure in said cylinder is exhausted, a cam drum for operating the various working parts of each section of the forming machine, a common drive between the said feeding device and said cam drums, a pneumatically operated clutch interposed between each of said cam drums and said common drive, and a multiple valve for each section actuated by a single handle and operable by movement in one direction when the section is in full operation to disengage the corresponding pneumatic clutch and exhaust the pressure from the cylinder associated with the charge-intercepting member of its section, whereby to stop the operation of said section and whereby its charge-intercepting member is moved by said spring to an inoperative position.

3. The combination with a glass feeding device of a ware forming machine, comprising a plurality of independent sections each timed to operate in predetermined timed relation with respect to said feeding device, charge delivery means by which the charges of glass from said feeding device are distributed to the several sections of the forming machine including charge-intercepting members, means to move said charge-intercepting members into and out of charge-receiving position with respect to said feeding device, means associated with each of said members to control said moving means to initiate and cut off the cyclic operation thereof, means responsive to the movement of said controlling means to a position to cut off the operation of said moving means to move the associated charge-intercepting member to its inoperative position, and a shut-off means for initiating and cutting off all the operating means of the entire section including said controlling means, whereby in starting a section, the said control means of said section is set in its "off" position and the shut-off means of said section thereafter moved to a position to start the operation of all parts of said section with the exception of the charge-intercepting member, and said control means is then operated to start the operation of said charge intercepting member in timed relation with the other mechanisms of the section, and whereby said shut-off means is operable at any time simultaneously to stop the operation of the various mechanisms of the section and to cause the movement of said charge-intercepting member to its inoperative position.

4. The combination with a single glass feeding device of a ware forming machine comprising a plurality of independent sections, each operable in timed relation with respect to said feeding device, means for distributing charges of glass from said feeding device to each of said sections, including an independently actuated charge-intercepting member for each section, actuating means for said members each comprising a pneumatic cylinder operative to move said member to its charge-receiving position with respect to said glass feeding device and a spring operative to withdraw said member to an inoperative position when the pressure in said cylinder is exhausted, a cam drum for operating the various working parts of each of said sections, a common drive between the said feeding device and said cam drums, a pneumatically operated clutch interposed between each of said cam drums and said common drive, and multiple valve for each section actuated by a single handle and operative by movement in one direction when the section is in full operation, to disengage the corresponding pneumatic clutch and exhaust the pressure from the cylinder associated with the charge-intercepting member of its section thus stopping the operation of said section and causing the movement of its charge-intercepting member to an inoperative position under the action of said spring, and a three-way valve in the pressure line between said multiple valve and said pneumatic cylinder, whereby the charge-intercepting member will be retained in an inoperative position until the other mechanisms of the section are in full operation in timed relation to said feeding device.

5. The combination with a single glass feeding device adapted to supply successive charges of glass at the ends of uniform time intervals of a ware forming machine comprising a plurality of independent sections each capable of completely forming articles, said sections being individually and collectively timed with respect to said feeding device to operate in a predetermined order, and means for operating a less number of sections of said machine in predetermined timed relation to said feeding device and with predetermined uniform time intervals between the supplying of glass charges to the successively fed remaining operating sections, whereby glass charges need not be diverted to cullet if a less number of sections of the forming machine than the total number are in operation.

6. The combination with a single glass feeding device adapted to supply successive charges of glass at the ends of uniform time intervals of a ware forming machine comprising a plurality of independent sections each capable of completely forming articles, said sections being individually and collectively timed with respect to said feeding device to operate in a predetermined order with equal intervals between the supplying of a charge to successively charged sections, and means for operating any desired less number of sections in any desired predetermined order, and with equal intervals between the supplying of charges thereto and in timed relation with respect to said feeding device.

7. A ware forming machine comprising a plurality of independent sections each capable of completely forming articles, said sections being individually and collectively timed with respect to a feeding device to operate in a predetermined order, and means for varying the timing of all of the mechanisms of one section collectively with respect to those of another section.

8. The combination with a single glass feeding device of a ware forming machine comprising a plurality of independent sections each capable of completely forming articles, a cam drum associated with each section for operating the various mechanisms thereof, a common drive between said feeding device and the forming machine, and a single tooth clutch between said common drive and the cam drum of each section, one component of said clutch being angularly adjustable relative to said cam drum, whereby the timing of all of the various mechanisms of each section may be collectively changed with respect to that of the mechanisms of any of the other sections.

9. The combination with a single glass feeding device of a ware forming machine comprising a plurality of independent sections each capable of completely forming articles, a cam drum associated with each section for operating the various mechanisms thereof, a common drive between said feeding device and the forming machine adapted positively to drive members adjacent to each of said cam drums, a movable clutch component associated with each of said members, a second clutch component comprising a ring securable to each of said cam drums in a plurality of angular positions and having a single recess therein for engagement with said movable clutch component, and a phase adjusting means located in said common drive for correcting the relative timing of said forming machine with respect to said feeding device, whereby upon a corresponding change being made in the ratio of the speed of the feeder drive with respect to that of said members, a less number of sections of the forming machine may be operated in timed relation with said feeding device to receive and form into finished articles all of the successive charges of glass supplied at even intervals from said feeding device.

10. In a glass blowing machine, a parison mold, a funnel, means for moving said funnel to and away from a position contiguous with the charging end of said mold, a settle blowhead adapted to be positioned on said funnel after the charge of glass has been introduced into said mold, and means to conduct settle blowing pressure to said head including a valve mechanism controlled by said funnel moving means, whereby settle blowing pressure is admitted to said head only when said funnel is in position on said mold.

11. In a glass blowing machine, a parison mold, a funnel, means for moving said funnel to and away from a position contiguous with the charging end of said mold, a combined settle blowhead and counterblow baffle adapted to be positioned on said funnel after the charge of glass has been introduced into said mold, and subsequently adapted to be positioned on said mold during the counterblow, means to conduct settle blowing pressure to said head including a valve controlled by said funnel moving means, and a duct communicating between said valve and said head, said valve being effective in the operative position of said funnel, to admit pressure to said duct, and in the inoperative position of said funnel, to open communication between said duct and the atmosphere, whereby to exhaust the pressure in said duct and prevent any pressure leaking by said valve from passing to said head when it is in use as a counterblow baffle.

12. In a glass blowing machine, a parison mold, a funnel, means for moving said funnel to and away from a position contiguous with the charging end of said mold, a settle blowhead adapted to be positioned on said funnel after the charge of glass has been introduced into said mold, means to conduct settle blowing pressure to said head including a valve mechanism controlled by said funnel moving means, a duct communicating between said valve and said head, whereby settle blowing pressure is admitted to said head only when said funnel is in position on said mold, a pressure regulating valve interposed in said duct, and a bleed passage communicating between said duct on the blowhead side of said pressure regulating valve and the atmosphere, whereby to permit the air displaced by the expansion of the parison during the counterblow to escape.

13. In a glassware forming machine, a final blow mold made in two complementary halves, means for opening and closing said mold halves, means for blowing a parison to final form in said mold, a bottom plate for said mold, and automatic means to tip said bottom plate after said mold halves are open to dump any glass remaining thereon, said tipping means comprising a fluid pressure cylinder, a piston therein, links connecting said piston with said bottom plate, a support rigid with said piston, resilient means to hold said bottom plate on said support, and stop means effective after a predetermined rectilinear downward movement of said bottom plate for causing it to be tipped by power applied through said links in opposition to said resilient means.

14. In a glass blowing machine, a mold made in two complementary halves, means for forming a glass article therein, a fluid pressure cylinder, a piston therein, mechanism connecting said piston with said mold halves to opening and closing them in response to movements of said piston, a member mounted for limited range of movement with respect to said cylinder, and means adapted automatically to move said member to move said piston a limited distance from its position when said mold is closed upon release of the opposing pressure in said cylinder, whereby to crack open said mold.

15. In a glass blowing machine, a mold made in two complementary halves, means for forming a glass article therein, a fluid pressure cylinder, a piston therein, mechanism connecting said piston with said mold halves for opening and closing them in response to movements of said piston, a member mounted for limited movement in one head of said cylinder and adapted to bear against the piston when it is near said head end of the cylinder, an adjustable stud to limit the movement of said member toward said piston, and a spring tending to move said member toward said piston and effective to move said piston a limited extent to crack said mold open when opposing pressure on said piston is released, the full opening of said mold being subsequently performed by the admission of fluid pressure to said head end of said cylinder.

16. In a glass blowing machine, a blow mold made in two complementary halves, automatic means for opening and closing said mold, a blowhead cooperable with said mold to blow a glass parison therein to final form and adapted to embrace the top finish of a glass article therein, means to move said blowhead into and out of its blowing position, means to admit blowing air through said blowhead to blow the glass in said mold, and additional automatic means for cracking open said mold halves, the last named means being timed to operate prior to the movement of said blowhead to its inoperative position and to the full opening of said mold, whereby to prevent the blown article from sticking to either of the mold halves.

17. In a glass blowing machine, a final blow mold made in two complementary halves, a blowhead and a bottom plate cooperating with said mold, a fluid pressure cylinder for opening and closing said mold, a piston in said cylinder, a mechanical system of linkages connecting said piston and the halves of said mold for transmitting motion therebetween, a member having a limited range of movement and adapted to bear against said piston near one end of its stroke, and means to move said member to move said piston a predetrmined amount from its endmost position when the opposing pressure is released to crack said mold prior to its full opening by fluid pressure acting on said piston in said cylinder, said blowhead and said bottom plate confining a blown glass article therebetween during the cracking of said mold to free it from the mold halves.

18. In a glassware blowing machine, a parison mold, a neck plunger for forming the initial blowing opening in a parison in said mold, an annular thimble about said neck plunger, a pneumatic cylinder and piston for moving said thimble into and out of operative position with respect to said mold, means also in said cylinder for moving said neck plunger with respect thereto and with respect to said thimble, and manually operable means accessible from the outside of said machine for moving said cylinder and associated parts up or down as an entirety to accommodate various size of parsion molds.

19. In a glassware blowing machine, a parison mold, a neck plunger for forming the initial blowing opening in a parsion in said mold, an annular thimble about said neck plunger, a pneumatic cylinder, a piston rigid with said thimble and disposed within said cylinder for moving said thimble vertically into and out of operative position with respect to said mold, said piston having a hollow vertically disposed cylindrical chamber formed therein, a piston rigid with said neck plunger and disposed within said chamber, means for moving the second named piston and said neck plunger vertically into and out of operative position with respect to said mold, means for settle blowing a parison in said mold during the raised position of both said thimble and said neck plunger, and means for counterblowing said parison thereafter with said thimble in its raised position and said neck plunger in its lower position.

20. In a glassware blowing machine, a parison mold, a neck plunger for forming the initial blowing opening in a parison in said mold, an annular thimble about said neck plunger, a pneumatic cylinder, a piston rigid with said thimble and disposed within said cylinder for moving said thimble vertically into and out of operative position with respect to said mold, said piston having a hollow vertically disposed cylindrical chamber formed therein, a piston rigid with said neck plunger and disposed within said chamber, means for moving the second named piston and said neck plunger vertically into and out of operative position with respect to said mold, a tube on said second named piston passing through the first named piston and telescoping into a chamber formed in the lower head of said cylinder, means to conduct counterblowing air to the lower end of the last named chamber and thence through said tube to said neck plunger, and means to prevent leakage of pressure used for raising said thimble from the lower portion of said cylinder along said tube and into said blow passage comprising an annular groove surrounding said tube and communicating with the atmosphere.

21. In a glass blowing machine, a blank mold made in two complementary portions, means for forming a glass blank therein, automatic means for fully opening and closing said mold, additional automatic means for cracking said mold open a predetermined extent from its closed position, means for operating said additional automatic means to crack said mold open after the formation of a blank therein, and means for varying as desired the time at which the last named means operates, whereby the cracking of the mold to permit the reheat of the chilled skin of the blank may be determined in accordance with the temperature condition of the glass being operated upon and the characteristics of the article to be made therefrom.

22. In a glass blowing machine, a blank mold made in two complementary portions, means for forming a glass blank therein, automatic means for fully opening and closing said mold, additional automatic means for cracking said mold open a predetermined extent from its closed position, means for operating said additional automatic means to crack said mold open after the formation of a blank therein, means for thereafter operating the first named automatic means to open the mold fully for the removal of the blank therefrom, a second mold to which the blank formed in the first named mold is to be transferred, means for transferring the blank formed in the first named mold to the second mold after a period for reheat in the first named mold, means for expanding the blank to the form of the second named mold, and means for adjustably timing the operation of the automatic fully opening means and the mold cracking means, whereby to compensate for variations in the temperature condition of the glass being worked and to compensate for differences in the characteristics of shape and size of the article being formed.

23. In a glass blowing machine, a blank mold made in two complementary portions meeting substantially in a vertical plane, a neck ring associated therewith, means for forming a glass blank in said mold and neck ring, independent automatic means for fully opening and closing said mold and said neck ring respectively, additional automatic means for cracking said mold open a predetermined extent from its closed position, means for operating said additional automatic means to crack said mold open after the formation of a blank therein, means for thereafter operating the first named automatic means to open said mold fully to leave the blank supported by said neck ring, a partible final blow mold to which the blank formed in the blank mold is to be transferred, automatic means to close said blow mold about the blank supported in said neck ring by a relative movement of the portions of said blow mold and said neck ring, and automatic means for expanding the blank to final form within said blow mold.

Signed at Baltimore, Maryland, this 3d day of May 1928.

HENRY W. INGLE.